US006459428B1

(12) United States Patent
Burk et al.

(10) Patent No.: US 6,459,428 B1
(45) Date of Patent: Oct. 1, 2002

(54) PROGRAMMABLE SAMPLE FILTERING FOR IMAGE RENDERING

(75) Inventors: Wayne Eric Burk, San Jose; Yan Y. Tang, Mountain View; Michael G. Lavelle, Saratoga; Philip C. Leung, Fremont; Michael F. Deering, Los Altos; Ranjit S. Oberoi, Saratoga, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/970,077

(22) Filed: Oct. 3, 2001

Related U.S. Application Data

(63) Continuation-in-part of application No. 09/413,103, filed on Oct. 6, 1999, which is a continuation-in-part of application No. 09/251,453, filed on Feb. 17, 1999.
(60) Provisional application No. 60/074,836, filed on Feb. 17, 1998.

(51) Int. Cl.[7] ............................................... G06T 15/00
(52) U.S. Cl. ........................................................ 345/419
(58) Field of Search ................................. 345/419, 420, 345/421, 422, 423, 424, 426, 427, 428, 581, 589, 611, 612, 613, 614, 615, 629, 473

(56) References Cited

U.S. PATENT DOCUMENTS

| | | | | | |
|---|---|---|---|---|---|
| 5,287,438 A | * | 2/1994 | Kelleher | ...................... | 345/613 |
| 5,481,669 A | * | 1/1996 | Poulton et al. | ............. | 345/505 |
| 5,668,940 A | * | 9/1997 | Steiner et al. | ............... | 345/592 |
| 5,742,277 A | * | 4/1998 | Gossett et al. | .............. | 345/611 |
| 5,745,125 A | * | 4/1998 | Deering et al. | ............. | 345/426 |
| 5,757,375 A | * | 5/1998 | Kawase | ...................... | 345/545 |
| 5,774,110 A | * | 6/1998 | Edelson | ....................... | 345/601 |
| 5,999,187 A | * | 12/1999 | Dehmlow et al. | .......... | 345/420 |
| 6,046,744 A | * | 4/2000 | Hoppe | .......................... | 345/419 |
| 6,064,393 A | * | 5/2000 | Lengyel et al. | ............. | 345/419 |
| 6,072,498 A | * | 6/2000 | Brittain et al. | ............. | 345/428 |
| 6,072,500 A | * | 6/2000 | Foran et al. | ................. | 345/611 |
| 6,128,001 A | * | 10/2000 | Gonsalves et al. | .......... | 345/442 |
| 6,204,859 B1 | * | 3/2001 | Jouppi et al. | ............... | 345/422 |
| 6,313,838 B1 | * | 11/2001 | Deering | ....................... | 345/420 |

* cited by examiner

*Primary Examiner*—Mark Zimmerman
*Assistant Examiner*—Enrique L. Santiago
(74) *Attorney, Agent, or Firm*—Conley, Rose & Tayon PC; Jeffrey C. Hood; Mark K. Brightwell

(57) ABSTRACT

A graphics system configured to perform programmable filtering of samples to generate pixel values. The graphics system comprises a frame buffer, an accelerator unit and a video output processor. The accelerator unit receives graphics primitives, renders samples for the graphics primitives, and stores the rendered samples into a sample area of the frame buffer. The accelerator unit subsequently reads the samples from the sample area of the frame buffer, and filters the samples with a programmable filter having a programmable support region. The resulting pixel values are stored in a pixel area of the frame buffer. The video output processor reads the pixel values from the pixel area and converts the pixel values into a video signal which is provided to a video output port.

23 Claims, 19 Drawing Sheets

PROGRAMMABLE SAMPLE FILTERING FOR IMAGE RENDERING

CROSS REFERENCES TO RELATED APPLICATIONS

This application is a continuation-in-part of U.S. patent application Ser. No. 09/251,453 entitled "A Graphics System With Programmable Real-Time Sample Filtering" filed on Feb. 17, 1999 which claims the benefit of U.S. Provisional Application No.60/074,836 entitled "UltraJava Graphics" filed on Feb. 17, 1998.

This application is a continuation-in-part of U.S. patent application Ser. No. 09/413,103 entitled "A Graphics System Which Renders Samples into a Sample Buffer and Generates Pixels in Response to Stored Samples at Different Rates", filed on Oct. 6, 1999 which is a continuation-in-part of U.S. patent application Ser. No. 09/251,453 entitled "A Graphics System With Programmable Real-Time Sample Filtering" filed on Feb. 17, 1999 which claims the benefit of U.S. Provisional Application No. 60/074,836 entitled "UltraJava Graphics" filed on Feb. 17, 1998.

BACKGROUND OF THE INVENTION

1. Field of the Invention

This invention relates generally to the field of computer graphics and, more particularly, to high performance graphics systems.

2. Description of the Related Art

A graphics system may generate samples in response to received graphics data and filter the samples to generate pixel values. In many conventional graphics systems, the sample filtering operation may be committed to hardware in such a fashion that the filter function (which is applied to the samples) is not readily changeable by the end user. For example, the filter function may be burned into ROM and/or into the structure of a circuit. Thus, the user may not able to adjust the filtering properties to accommodate his/her preferences in visual output quality, to compensate for changing display conditions, to generate special visual effects, etc. Furthermore, many conventional graphics systems may perform sample filtering over a fixed size support region. The end user is not able to select larger regions or smaller regions. For example, larger support regions may be desirable to obtain increased accuracy of reconstruction, and smaller support regions may be desirable to get increased pixel output rate. Thus, there exists a need for a graphical computing system which could filter samples with a programmable filter function and/or a programmable filter support region.

SUMMARY OF THE INVENTION

A graphics system may be configured to perform programmable filtering of samples to generate pixel values. The graphics system may comprise a frame buffer, an accelerator unit and a video output processor. The accelerator unit may receive graphics primitives, render samples in response to the graphics primitives, and store the rendered samples into a sample area of the frame buffer. The accelerator unit may subsequently read the samples from the sample area of the frame buffer, and filter the samples with a programmable filter. The resulting pixel values are stored in a pixel area of the frame buffer. The video output processor reads the pixel values from the pixel area and converts the pixel values into a video signal which is provided to a video output port.

In one set of embodiments, the accelerator unit includes a filter weight lookup table and a sample filter unit. The filter weight lookup table may be implemented in RAM and may store filter weights defining the programmable filter. The sample filter unit performs a filtering operation on the samples using filter weights obtained from the filter weight lookup table. The filter weights may be downloaded to the filter weight lookup table from a host software program executing on a host computer (e.g. a system initialization time).

The sample area of the frame buffer may be organized in terms of bins. Each bin stores a set of samples and corresponds to a region (e.g. a square) of the rendering space. Thus, the sample filter may be configured to read a set of bins which cover the support region of the programmable filter centered at a current pixel position. This set of bins may be referred to herein as the bin footprint.

The sample filter may compute normalized square distances for samples in the bin footprint with respect to a current pixel position and determine which of said samples reside interior to the filter support region by comparing said normalized square distances to an upper limit value. The normalized square distance for a given sample may be computed by (i) computing a sum of squares of horizontal and vertical displacements of the given sample with respect to the current pixel position and (ii) multiplying the sum of squares by the reciprocal of the square of a radius of the filter support region. Furthermore, the sample filter may be configured to:

assign a weight value of zero for each sample that resides exterior to the filter support region;

assign a weight value for each sample interior to the filter support region by accessing the filter weight lookup table with the corresponding normalized square distance;

multiply sample attributes (e.g. red, green, blue, α) for each of said samples by the corresponding weight value to obtain weighted sample attributes;

accumulate sums of weighted sample attributes (i.e. one sum per attribute);

accumulate a sum of the weight values associated with the samples; and multiply each of said attribute sums by a reciprocal of the weight sum.

In some embodiments, the accelerator unit may be programmable to perform various types of filtering. For example, in a box filtering mode, the accelerator unit may employ a box filter instead of a circularly symmetric filter. The box filter may have a square support region with programmable radius. The radius is the square support region is defined to be one-half the side length. Samples falling interior to the square support region are assigned the same constant filter weight value (e.g. one). As in the circularly symmetric mode, the sums of weighted sample attributes are normalized by the sum of filter weights.

BRIEF DESCRIPTION OF THE DRAWINGS

The foregoing, as well as other objects, features, and advantages of this invention may be more completely understood by reference to the following detailed description when read together with the accompanying drawings in which:

FIG. 4 is diagram illustrating traditional pixel calculation;

FIG. 5A is diagram illustrating one embodiment of super-sampling;

FIG. 5B is diagram illustrating a random distribution of samples;

Figure 1:
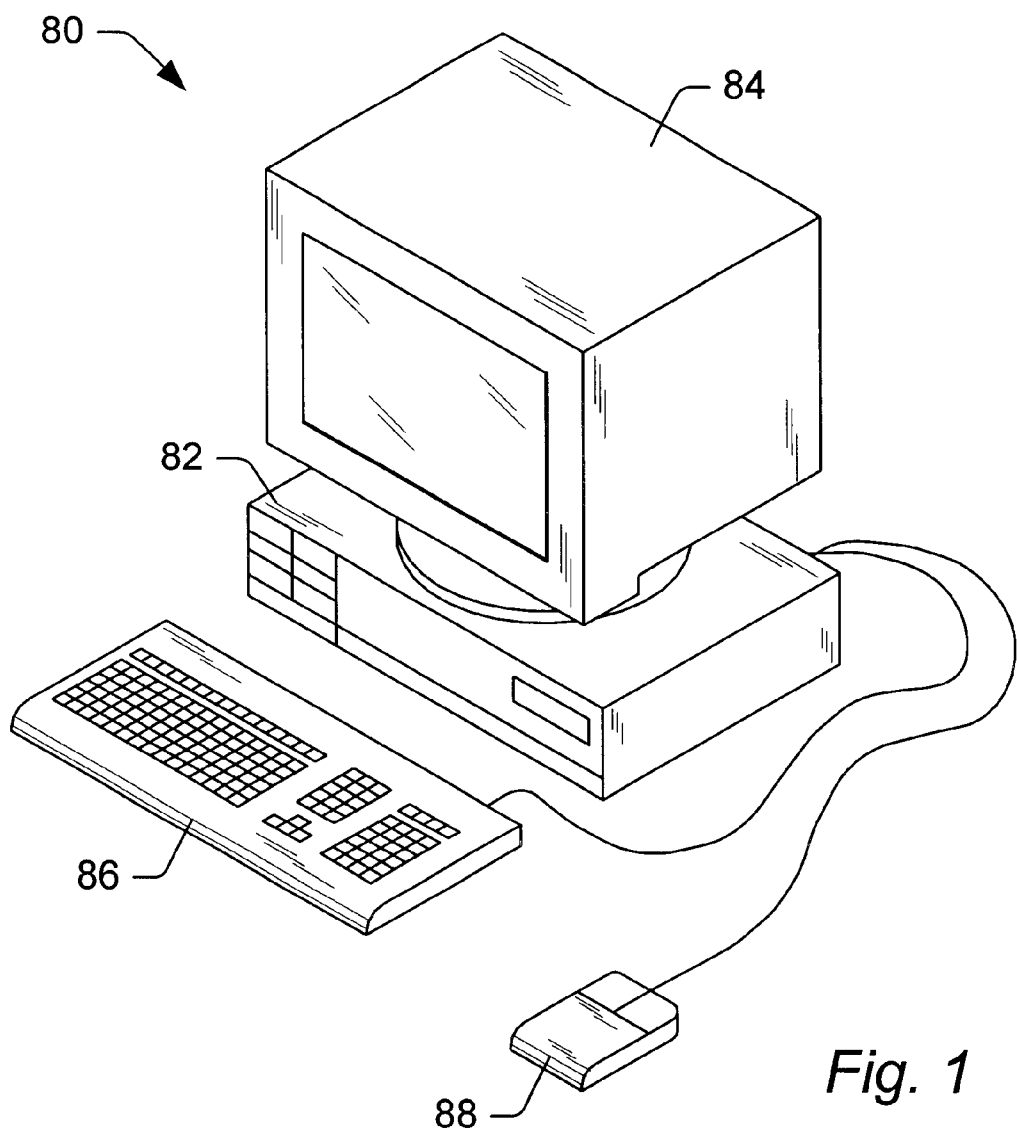
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Computer System —FIG. 1

Referring now to FIG. 1, one embodiment of a computer system that includes a three-dimensional (3-D) graphics system is shown. The 3-D graphics system may be comprised in any of various systems such as computer systems, network PCs, Internet appliances, televisions (including HDTV systems and interactive television systems), personal digital assistants (PDAs), and other devices which display 2D and/or 3D graphics, among others.

As shown, the computer system 80 comprises a system unit 82 and a video monitor or display device 84 coupled to the system unit 82. The display device 84 may be realized by any of various types of display monitors or devices such as CRTs, LCDs, gas-plasma displays and liquid crystal on silicon (LCOS) displays. Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 may include a super-sampled sample buffer with a programmable sample-to-pixel calculation unit to improve the quality and realism of images displayed on display device 84.

Figure 2:
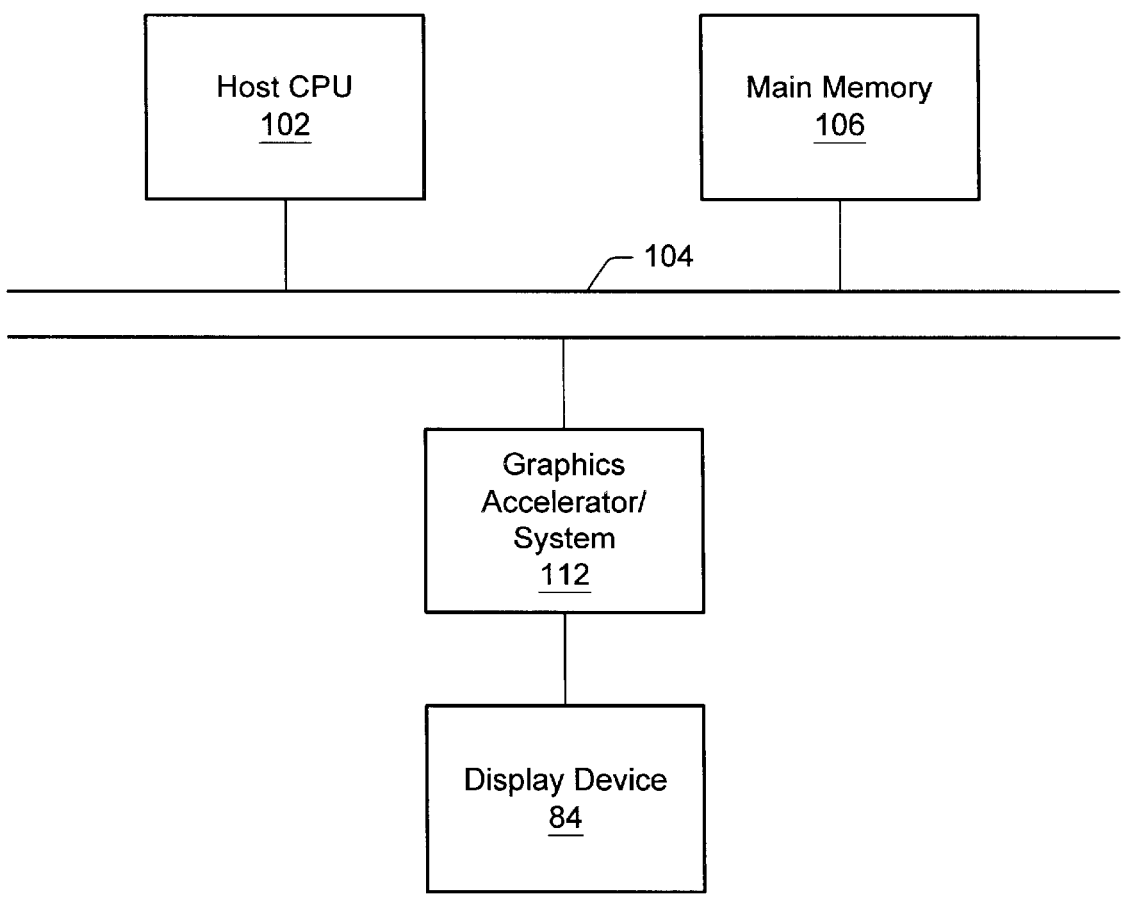
FIG. 2 is a simplified block diagram of the computer system of FIG. 1.

Computer System Block Diagram —FIG. 2

Referring now to FIG. 2, a simplified block diagram illustrating the computer system 80 of FIG. 1 is shown. Elements of the computer system that are not necessary for an understanding of the present invention are not shown for convenience. As shown, the computer system 80 includes a central processing unit (CPU) 102 coupled to a: high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic random access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 may couple to the high-speed memory bus 104. The 3-D graphics system 112 may couple to bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 may couple to the 3-D graphics system 112.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programmer's interface (API) such as OpenGL® or Java 3D™ may execute on host CPU 102 and generate commands and data that define a geometric primitive (graphics data) such as a polygon for output on display device 84. Host processor 102 may transfer the graphics data to memory subsystem 106. Thereafter, the host processor 102 may transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in an increased rate of polygon processing. Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module.

Figure 3:
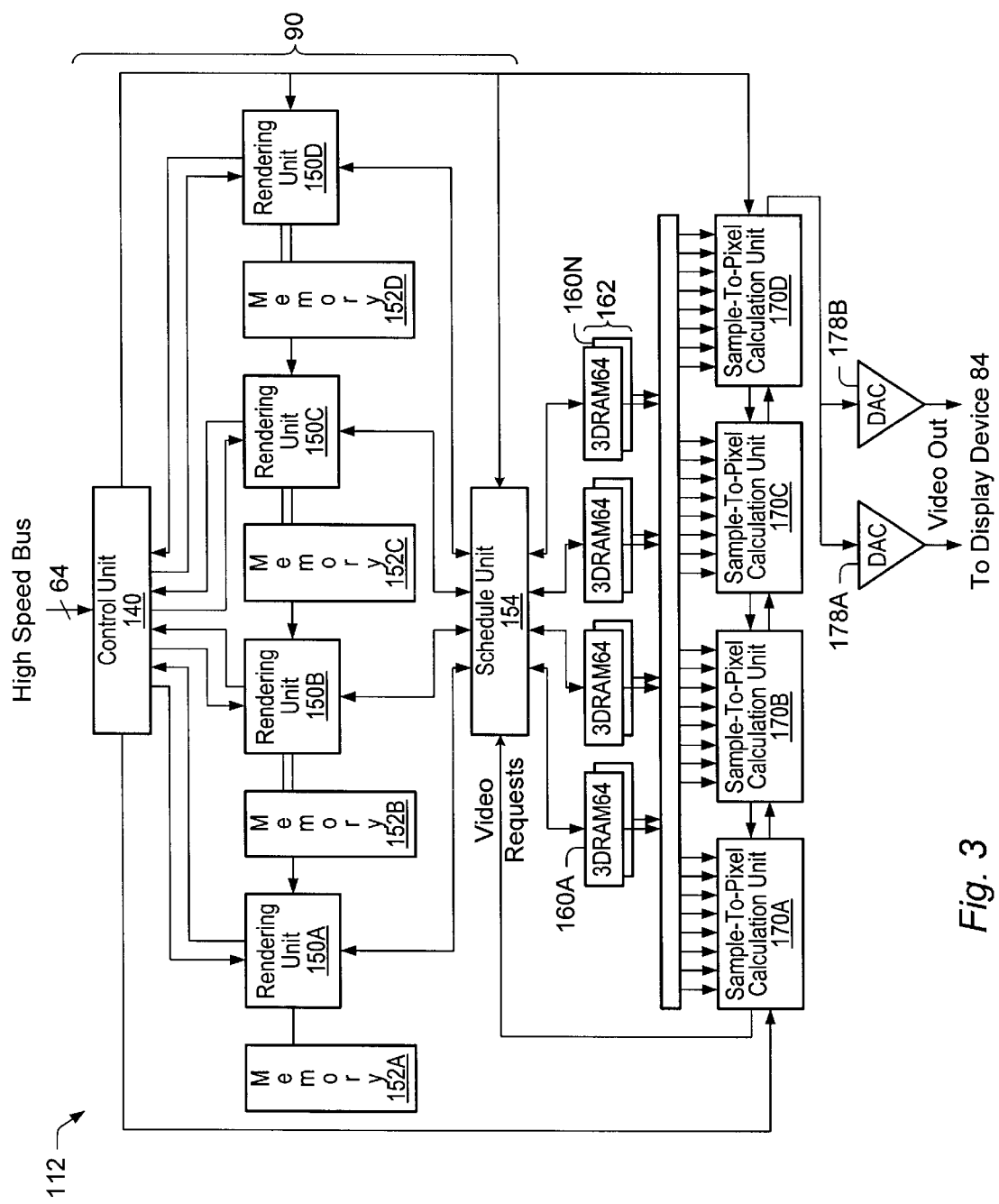
FIG. 3 is a block diagram illustrating more details of one embodiment of the graphics system of FIG. 1.

Graphics System —FIG. 3

Referring now to FIG. 3, a block diagram illustrating details of one embodiment of graphics system 112 is shown. As shown in the figure, graphics system 112 may comprise one or more graphics processors 90, one or more sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, graphics processor 90 also comprises one or more control units 140, one or more data memories 152A–D, and one or more schedule units 154. Sample buffer 162 may comprise one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise a stream of graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, viewport set-up, and sample rendering on the various graphics primitives occurring within the graphics data.

In embodiments of graphics system 112 that support decompression, the graphics data received by each rendering unit 150 may be decompressed into one or more graphics primitives which are then rendered in terms of samples. The term "primitive" refers to components of objects that define its shape (e.g., points, lines, triangles, polygons in two or three dimensions, polyhedra, or free-form surfaces in three dimensions). Rendering units 150 may comprise any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), rotating the object (e.g., in three-dimensional space, or "3-space"). Transformation may also include shearing, reflection, projection, or more generally, any linear mapping. In some embodiments, transformation may include non-linear mappings as well.

Lighting may be performed using any of a variety of shading algorithms such as constant shading, Gouraud shading or Phong shading.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Viewport set-up refers to mapping primitives to a three-dimensional viewport. This involves translating and transforming the objects from their original "world-coordinate" system to the established viewport's coordinates. This creates the correct perspective for three-dimensional objects displayed on the screen.

Sample rendering refers to calculations that are performed to generate samples for graphics primitives. For example, the vertices of a triangle in 3-D may be projected onto the 2-D viewport. The projected triangle may be populated with samples, and values (e.g. red, green, blue and z values) may be assigned to the samples based on the corresponding values already determined for the triangle vertices. (For example, the red value for each sample in the triangle may be interpolated from the known red values of the vertices.) These sample values for the projected triangle are stored in sample buffer 162. A virtual image accumulates in sample buffer 162 as successive primitives are rendered. Thus, the 2-D viewport is said to be a virtual screen on which the virtual image is rendered. Points in the 2-D viewport are described in terms of virtual screen coordinates X and Y, and are said to reside in rendering space or virtual screen space.

When the virtual image is complete, e.g., when all graphics primitives corresponding to a frame have been rendered, sample-to-pixel calculation units 170 may access the samples comprising the virtual image, and may filter the samples to generate pixel values. In other words, the sample-to-pixel calculation units 170 may perform a spatial convolution of the virtual image with respect to a convolution kernel C(X,Y) to generate pixel values. For example, a red value $R_p$ for a pixel P may be computed at any location $(X_p,Y_p)$ in virtual screen space based on the relation $$R_p = \frac{1}{E} \sum C(X_k - X_p, Y_k - Y_p) R(X_k, Y_k),$$

where the summation is evaluated at samples $(X_k,Y_k)$ in the neighborhood of location $(X_p,Y_p)$. Since convolution kernel C(X,Y) is defined only in a neighborhood of the origin, the displaced kernel $C(X -X_p, Y -Y_p)$ is defined only in a neighborhood of location $(X_p,Y_p)$. Similar summations to compute green and blue pixel values in terms of the green and blue sample values respectively may be performed in parallel with the red pixel value summation.

The value E is a normalization value that may be computed according to the relation $$E = \Sigma C(X_k - X_p, Y_k - Y_p),$$

where the summation is evaluated for the same samples $(X_k,Y_k)$ as in the red pixel value summation above. The summation for the normalization value E may be performed in parallel with the red, green and/or blue pixel value summations. The location $(X_p,Y_p)$ is referred to as a pixel center, pixel origin, pixel position or filter center.

Rendering units 150A–D may generate samples in the two-dimensional rendering space with a spatial density higher than the density of pixels. In this case, the samples are referred to as "supersamples". Super-sampling is described in greater detail below. Note that one or more of rendering units 150A–D may include a number of smaller functional units, e.g., a separate set-up/decompress unit and a lighting unit. More details on super-sampling are discussed in the following books:

"Principles of Digital Image Synthesis" by Andrew S. Glassner, 1995, Morgan Kaufman Publishing (Volume 1);

"The Renderman Companion" by Steve Upstill, 1990, Addison Wesley Publishing; and "Advanced Renderman: Beyond the Companion" by Anthony A. Apodaca.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise two 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Sample buffer 162 comprises sample memories 160A–160N, which are configured to store the samples generated by the rendering units. As used herein, the term "sample buffer" refers to one or more memories which store samples. As previously noted, one or more samples are filtered to form output pixels (i.e., pixels displayable on a display device). The number of samples stored per frame may be greater than, equal to, or less than the total number of pixels output to the display device(s) per frame.

Stated another way, the sample buffer stores a plurality of samples that have positions that correspond to locations in a two-dimensional screen space. The density of sample positions in the screen space may be higher than, equal to, or less than the density of pixel positions in the screen space.

Sample memories 160A–160N may comprise any of a number of different types of memories (e.g., SDRAMs, SRAMs, RDRAMs, 3DRAMs or 3DRAM64s) in varying sizes. In one embodiment, each schedule unit 154 is coupled to four banks of sample memories, wherein each bank comprises four 3DRAM-64 memories. Together, the 3DRAM-64 memories may form a 116-bit deep supersampled sample buffer. Furthermore, the 3DRAM-64 memories may store multiple samples per pixel. For example, in one embodiment, each sample memory 160A–160N may store up to sixteen samples per pixel.

3DRAM-64 memories are specialized memories configured to support full internal double-buffering with single buffered Z in one chip. The double-buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexor that selects which buffer's contents will be output. 3DRAM-64 memories are next-generation 3DRAM memories that may soon be available from Mitsubishi Electric Corporation's Semiconductor Group. In one embodiment, four chips used in combination are sufficient to create a double-buffered 1280×1024 super-sampled sample buffer. Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also increases effective memory bandwidth since information may be written into the memory without the traditional process of reading data out, performing a z comparison, and then writing data back in. Instead, the data may be simply written into the 3DRAM-64, with the memory performing the steps described above internally.

In other embodiments of graphics system 112, other memories (e.g., SDRAMs, SRAMs, RDRAMS, or current generation 3DRAMs) may be used to form sample buffer 162.

Graphics processor 90 may be configured to generate a plurality of sample positions according to a particular sample positioning scheme (e.g., a regular grid, a perturbed regular grid, etc.). Alternatively, the sample positions (or offsets that are added to regular grid positions to form the sample positions) may be read from a sample position memory (e.g., a RAM/ROM table). Upon receiving a polygon that is to be rendered, graphics processor 90 determines which samples fall within the polygon based upon the sample positions. Graphics processor 90 renders the samples that fall within the polygon and stores rendered samples in sample memories 160A–N. Note as used herein the terms render and draw are used interchangeably and refer to calculating color values for samples. Depth values, alpha values, and other per-sample values may also be calculated in the rendering or drawing process.

E. Sample-to-pixel Calculation Units

Sample-to-pixel calculation units 170A–D may be coupled between sample memories 160A–N and DACs 178A–B. Sample-to-pixel calculation units 170A–D are configured to read samples from sample memories 160A–N and then perform a filtering operation (e.g. a convolution filtering) on the samples to generate the output pixel values which are output to DACs 178A–B. The sample-to-pixel calculation units 170A–D are programmable to allow them to perform different filter functions at different times, depending upon the type of output desired.

In one embodiment, sample-to-pixel calculation units 170 may implement a super-sample reconstruction band-pass filter on samples (stored in sample memories 160A–N) to generate pixel values.

Each of sample-to-pixel calculation units 170 may store a start position $(X_s, Y_s)$, a horizontal step size $\Delta X$ and a vertical step size $\Delta Y$ for generating a rectangular array of pixel centers (X,Y) in the 2-D viewport. Sample-to-pixel calculation units 170 may generate the pixel centers and corresponding pixel values according to the following pseudo-code fragment.

```
I=0;
J=0;
X^r=X_s;
Y^r=Y_s;
while (J<N) {
    while (I < M) {
        PixelValues = Filter (X^r, Y^r);
        Output PixelValues;
        X^r = X^r + \Delta X ;
        I = I + 1;
    }
    X^r=X_s;
    Y^r=Y^r+\Delta Y ;
    J=J+1;
}
```

A filter operation (e.g. a convolution) is performed on samples in the neighborhood of each pixel position $(X^r, Y^r)$ in the rectangular array. The filter operation at each pixel position generates a set of pixel values (e.g. red, green, blue and alpha values). Once computed, the pixel values are transmitted to one or more display devices. The inner loop generates successive pixel centers $(X^r, Y^r)$ within a single row. The outer loop generates successive rows. The rectangular pixel centers $(X^r, Y^r)$ are spaced with distance $\Delta X$ horizontally and $\Delta Y$ vertically. The start position $(X_s, Y_s)$ controls the location of the first rectangular pixel in the first row, and thus, determines the position of the whole rectangular array. The above fragment may be executed once per video frame per sample-to-pixel calculation unit.

In one set of embodiments, the horizontal step size $\Delta X$ and vertical step size $\Delta Y$ between pixel positions and the start position $(X_s, Y_s)$ are programmable parameters. For example, a software routine running on host CPU 102 may program this values during an initialization phase of a graphics session.

It is noted that other array structures are contemplated. For example, a hexagonal array may be easily arranged by shifting odd rows horizontally with respect to even rows.

The pseudo-code fragment presented above serves to describe the arrangement of computations performed by the sample-to-pixel calculation units 170 in various embodiments. These computations may be implemented in dedicated hardware and/or programmable hardware responsive to program code.

To determine pixel values (e.g. red, green, blue) at a current pixel position in the rendering space, a sample-to-pixel calculation unit may identify those samples that fall within the current filter support (i.e. the filter support centered on the current pixel position) and apply a filter function to the identified samples. The filter function may assign to each identified sample a filter weight based on its position (or distance) with respect to the pixel position.

The filtering operations performed by sample-to-pixel calculation units 170 may use any of a variety of filters, either alone or in combination. For example, the filtering operations may comprise convolution with a box filter, a tent filter, a cylindrical filter, a cone filter, a Gaussian filter, a Catmull-Rom filter, a Mitchell-Netravali filter or any of various windowed approximations of a sinc filter. Furthermore, the support of the filters used by sample-to-pixel calculation units 170 may be circular, elliptical, rectangular (e.g. square), triangular, hexagonal, etc. For example, in one embodiment, sample-to-pixel calculation units 170 provide hardware support for a box filter with a square support.

Sample-to-pixel calculation units 170 may also be configured with one or more of the following features: color look-up using pseudo color tables, direct color, inverse gamma correction, and conversion of pixels to non-linear light space. Other features of sample-to-pixel calculation units 170 may include programmable video timing generators, programmable pixel clock synthesizers, cursor generators, and crossbar functions.

F. DACs

DACs 178A–B operate as the final output stage of graphics system 112. The DACs 178A–B serve to translate the digital pixel data received from sample-to-pixel calculation units 170A–D into analog video signals that are then sent to the display device(s). Note in one embodiment DACs 178A–B may be bypassed or omitted completely in order to output digital pixel data in lieu of analog video signals. This. may be useful when display device 84 is based on a digital technology (e.g., an LCD or a digital micro-mirror display).

Figures 4, 5A, 5B:
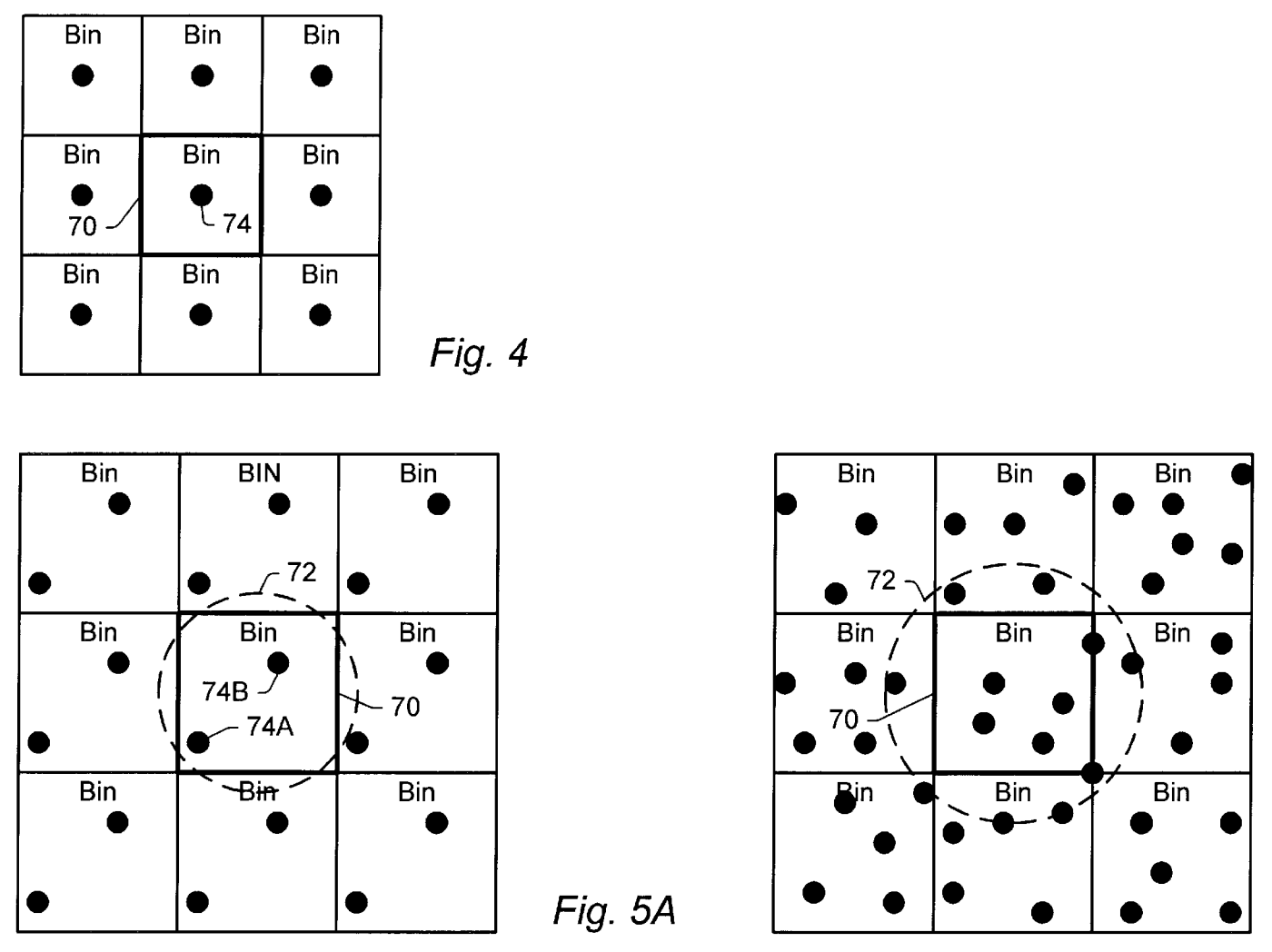

Super—Sampling —FIGS. 4–5

FIG. 4 illustrates a portion of rendering space in a non-super-sampled mode of operation. The dots denote sample locations. The rectangular boxes superimposed on the rendering space are referred to as bins. A rendering unit (e.g. one of rendering units 150A–D) may generate one sample in each bin (e.g. at the center of each bin). Values of red, green, blue, z, etc. are computed for each sample.

The sample-to-pixel calculation units 170 may be programmed to generate one pixel position in each bin (e.g. at the center of each bin). For example, if the bins are squares with side length one, the horizontal and vertical step sizes between successive pixel positions may be set equal to one.

Each pixel may be computed on the basis of one or more samples. For example, the pixel located in bin 70 may simply take the values of sample 74 in the same bin. Alternatively, the pixel located in bin 70 may be computed on the basis of filtering samples in a support region covering multiple bins including bin 70.

Turning now to FIG. 5A, an example of one embodiment of super-sampling is illustrated. In this embodiment, two samples are computed per bin. The samples are distributed according to a regular grid. Suppose that the sample-to-pixel calculation unit generates one pixel position at the center of each bin. (Again, the horizontal and vertical pixel step sizes may be set to one.)

The pixel at the center of bin 70 may be computed on the basis of the two samples 74A and 74B falling in support region 72. The radius of the support region may be programmable. With a larger radius, the support region 72 would cover samples from neighboring bins.

Alternatively, the sample-to-pixel calculation unit may operate in a non-supersampled mode even though there are two samples per bin and one pixel position at the center of each bin. For example, the pixel at the center of each bin may be determined by throwing away all samples in the bin except the single sample closest to the pixel position. However, a number of advantages arise from computing pixel values based on multiple samples.

The sample-to-pixel calculation unit may compute each pixel by operating on samples with a filter. Support region 72 illustrates the support of a filter which is localized at the center of bin 70. The support of a filter is the set of locations over which the filter (i.e. the filter kernel) is defined. In this example, the support region 72 is a circular disc. The output pixel values (e.g. red, green, blue) for the pixel at the center of bin 70 are determined only by samples 74A and 74B, because these are the only samples which fall within support region 72. This filtering operation may advantageously improve the realism of a displayed image by smoothing abrupt edges in the displayed image (i.e., by performing anti-aliasing). The filtering operation may simply average the values of samples 74A–B to form the corresponding output values of pixel 70. More generally, the filtering operation may generate a weighted sum of the values of samples 74A–B, where the contribution of each sample is weighted according to some function of the sample's position (or distance) with respect to the center of support region 72. The filter, and thus support region 72, may be repositioned for each output pixel being calculated. For example, the filter center may visit the center of each bin. Other filters and filter positioning schemes are also possible and contemplated.

In the example of FIG. 5A, there are two samples per pixel. In general, however, there is no requirement that the number of samples be equal to the number of pixels. The number of samples may be larger than or smaller than the number of pixels.

Turning now to FIG. 5B, another embodiment of super-sampling is illustrated. In this embodiment, the samples are positioned randomly. Thus, the number of samples falling within the filter support region may vary from pixel to pixel. Render units 150A–D calculate color information at each sample position.

Super-Sampled Sample Buffer with Real-Time Convolution —FIGS. 6–13

Figure 6:
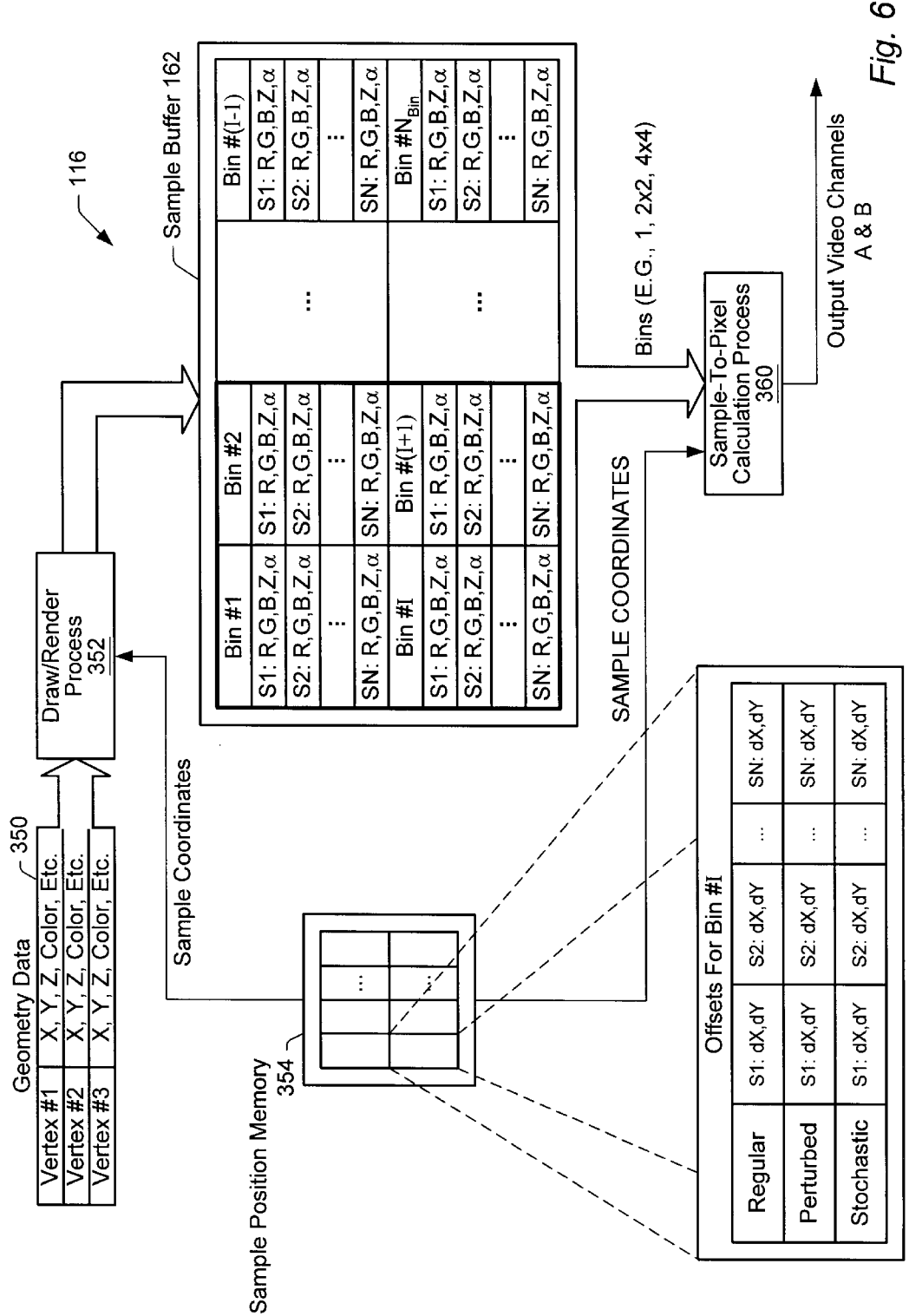
FIG. 6 is a diagram illustrating details of one embodiment of a graphics system having one embodiment of a variable resolution super-sampled sample buffer.

Turning now to FIG. 6, a diagram illustrating one possible configuration for the flow of data through one embodiment of graphics system 112 is shown. As the figure shows, geometry data 350 is received by graphics system 112 and used to perform draw process 352. The draw process 352 is implemented by one or more of control units 140, rendering units 150, memories 152, and schedule unit 154. Geometry data 350 comprises data for one or more polygons. Each polygon comprises a plurality of vertices (e.g., three vertices in the case of a triangle). Some of the vertices may be shared between multiple polygons. Data such as x, y, and z coordinates, color data, lighting data and texture map information may be included for each vertex.

In addition to the vertex data, draw process 352 (which may be performed by rendering units 150A–D) also receives sample coordinates from a sample position memory 354. In one embodiment, position memory 354 is embodied within rendering units 150A–D. In another embodiment, position memory 354 may be realized as part of texture and render memories 152A–152D, or as a separate memory. Sample position memory 354 is configured to store position information for samples that are calculated in draw process 352 and then stored into super-sampled sample buffer 162. In one embodiment, position memory 354 may be configured to store entire sample addresses. Alternatively, position memory 354 may be configured to store only x- and y-offsets for the samples. Storing only the offsets may use less storage space than storing each sample's entire position. The offsets may be relative to bin coordinates or relative to positions on a regular grid. The sample position information stored in sample position memory 354 may be read by a dedicated sample position calculation unit (not shown) and processed to calculate sample positions for graphics processor 90. More detailed information on sample position offsets is included below (see the description of FIGS. 9 and 10).

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus, may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, in some embodiments, it may not be necessary to store sample positions at the time of their generation for draw process 352.

As shown in the figure, sample position memory 354 may be configured to store sample offsets dX and dY generated according to a number of different schemes such as a regular square grid, a regular hexagonal grid, a perturbed regular grid, or a random (stochastic) distribution. Graphics system 112 may receive an indication from the host application or the graphics API that indicates which type of sample positioning scheme is to be used. Thus the sample position memory 354 is configurable or programmable to generate position information according to one or more different schemes. More detailed information on several sample position schemes are described further below (see description of FIG. 8).

In one embodiment, sample position memory 354 may comprise a RAM/ROM that contains stochastically determined sample points or sample offsets. Thus, the density of samples in the rendering space may not be uniform when observed at small scale. As used herein, the term "bin" refers to a region or area in virtual screen space.

An array of bins may be superimposed over the rendering space, i.e. the 2D viewport, and the storage of samples in sample buffer 162 may be organized in terms of bins. Sample buffer 162 may comprise an array of memory blocks which correspond to the bins. Each memory block may store the sample values (e.g. red, green, blue, z, alpha, etc.) for the samples that fall within the corresponding bin. The approximate location of a sample is given by the bin in which it resides. The memory blocks may have addresses which are easily computable from the corresponding bin locations in virtual screen space, and vice versa. Thus, the use of bins may simplify the storage and access of sample values in sample buffer 162.

The bins may tile the 2-D viewport in a regular array, e.g. in a square array, rectangular array, triangular array, hexagonal array, etc., or in an irregular array. Bins may occur in a variety of sizes and shapes. The sizes and shapes may be programmable. The maximum number of samples that may populate a bin is determined by the storage space allocated to the corresponding memory block. This maximum number of samples per bin is referred to herein as the bin sample capacity, or simply, the bin capacity. The bin capacity may take any of a variety of values. The bin capacity value may be programmable. Henceforth, the memory blocks in sample buffer 162 which correspond to the bins in rendering space will be referred to as memory bins.

The specific position of each sample within a bin may be determined by looking up the sample's offset in the RAM/ROM table, i.e., the sample's offset with respect to the bin position (e.g. the lower-left corner or center of the bin, etc.). However, depending upon the implementation, not all choices for the bin capacity may have a unique set of offsets stored in the RAM/ROM table. Offsets for a first bin capacity value may be determined by accessing a subset of the offsets stored for a second larger bin capacity value. In one embodiment, each bin capacity value supports at least four different sample positioning schemes. The use of different sample positioning schemes may reduce final image artifacts that would arise in a scheme of naively repeating sample positions.

In one embodiment, sample position memory 354 may store pairs of 8-bit numbers, each pair comprising an x-offset and a y-offset. When added to a bin position, each pair defines a particular position in rendering space. To improve read access times, sample position memory 354 may be constructed in a wide/parallel manner so as to allow the memory to output more than one sample location per read cycle.

Once the sample positions have been read from sample position memory 354, draw process 352 selects the samples that fall within the polygon currently being rendered. Draw process 352 then calculates depth (z), color information, and perhaps other sample attributes (which may include alpha and/or a depth of field parameter) for each of these samples and stores the data into sample buffer 162. In one embodiment, sample buffer 162 may only single-buffer z values (and perhaps alpha values) while double-buffering other sample components such as color. Unlike prior art systems, graphics system 112 may use double-buffering for all samples (although not all components of samples may be double-buffered, i.e., the samples may have some components that are not double-buffered).

Operating in parallel with draw process 352, filter process 360 may be configured to:

(a) read sample values from sample buffer 162, (b) read corresponding sample positions from sample position memory 354, (c) filter the sample values based on their positions (or distance) with respect to the pixel center (i.e. the filter center), (d) output the resulting output pixel values onto video channels A and/or B.

Sample-to-pixel calculation units 170 implement filter process 360. Filter process 360 is operable to generate the red, green, and blue values for an output pixel based on a spatial filtering of the corresponding data for a selected plurality of samples, e.g. samples falling in a filter support region around the current pixel center in the rendering space. Other values such as alpha may also be generated.

In one embodiment, filter process 360 is configured to:

(i) determine the distance of each sample from the pixel center;

(ii) multiply each sample's attribute values (e.g., red, green, blue, alpha) by a filter weight that is a specific (programmable) function of the sample's distance (or square distance) from the pixel center;

(iii) generate sums of the weighted attribute values, one sum per attribute (e.g. a sum for red, a sum for green, . . . ), and (iv) normalize the sums to generate the corresponding pixel attribute values.

In the embodiment just described, the filter kernel is a function of distance from the pixel center. However, in alternative embodiments, the filter kernel may be a more general function of X and Y sample displacements from the pixel center, or a function of some non-Euclidean distance from the pixel center. Also, the support of the filter, i.e. the 2-D neighborhood over which the filter kernel is defined, need not be a circular disk.

Figure 7:
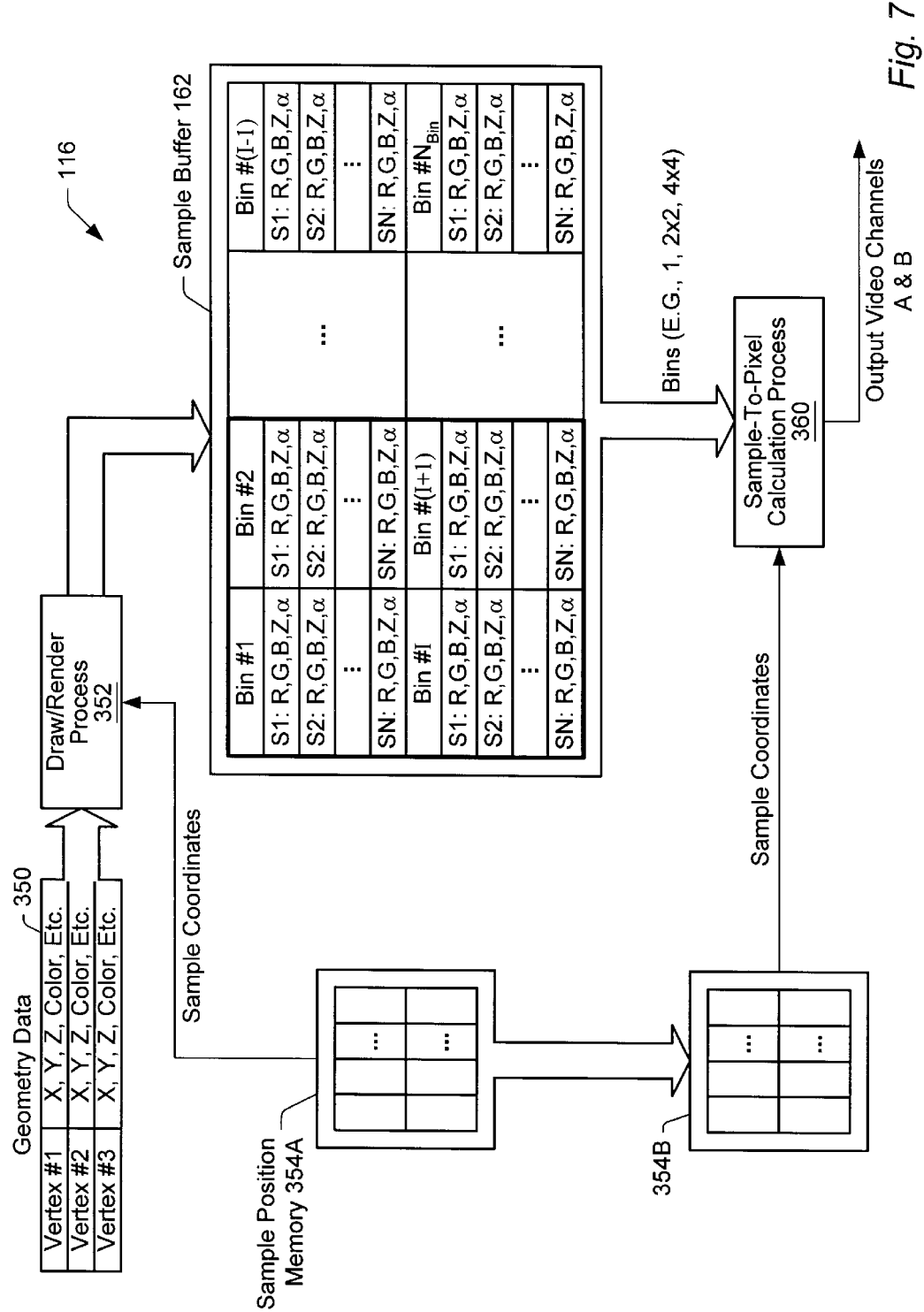
FIG. 7 is a diagram illustrating details of another embodiment of a graphics system having one embodiment of a variable resolution super-sampled sample buffer.

Turning now to FIG. 7, a diagram illustrating an alternate embodiment of graphics system 112 is shown. In this embodiment, two or more sample position memories 354A and 354B are utilized.

The sample position memories 354A–B may be double-buffered. If the sample positions are kept the same from frame to frame, then the sample positions may be single buffered. However, in embodiments where the sample positions vary from frame to frame, graphics system 112 may be advantageously configured to double-buffer the sample positions. The sample positions may be double buffered on the rendering side (i.e., memory 354A may be double buffered) and or the filter/convolve side (i.e., memory 354B may be double buffered). Other combinations are also possible. For example, memory 354A may be single-buffered, while memory 354B is doubled buffered. This configuration may allow one side of memory 354B to be used for refreshing (i.e., by filter/convolve process 360) while the other side of memory 354B is used being updated. In this configuration, graphics system 112 may change sample position schemes on a per-frame basis by shifting the sample positions (or offsets) from memory 354A to double-buffered memory 354B as each frame is rendered. Thus, the positions used to calculate the samples (read from memory 354A) are copied to memory 354B for use during the filtering process (i.e., the sample-to-pixel conversion process). Once the position information has been copied to memory 354B, position memory 354A may then be loaded with new sample position offsets to be used for the second frame to be rendered. In this way the sample position information follows the samples from the draw/render process to the filter process.

In yet another alternative embodiment, rendering units 150 may store offset tags with the samples in sample buffer 162. The offset tags may be used by the sample-to-pixel calculation units to look-up the offset associated with each particular sample.

Sample Positioning Schemes

Figure 8:
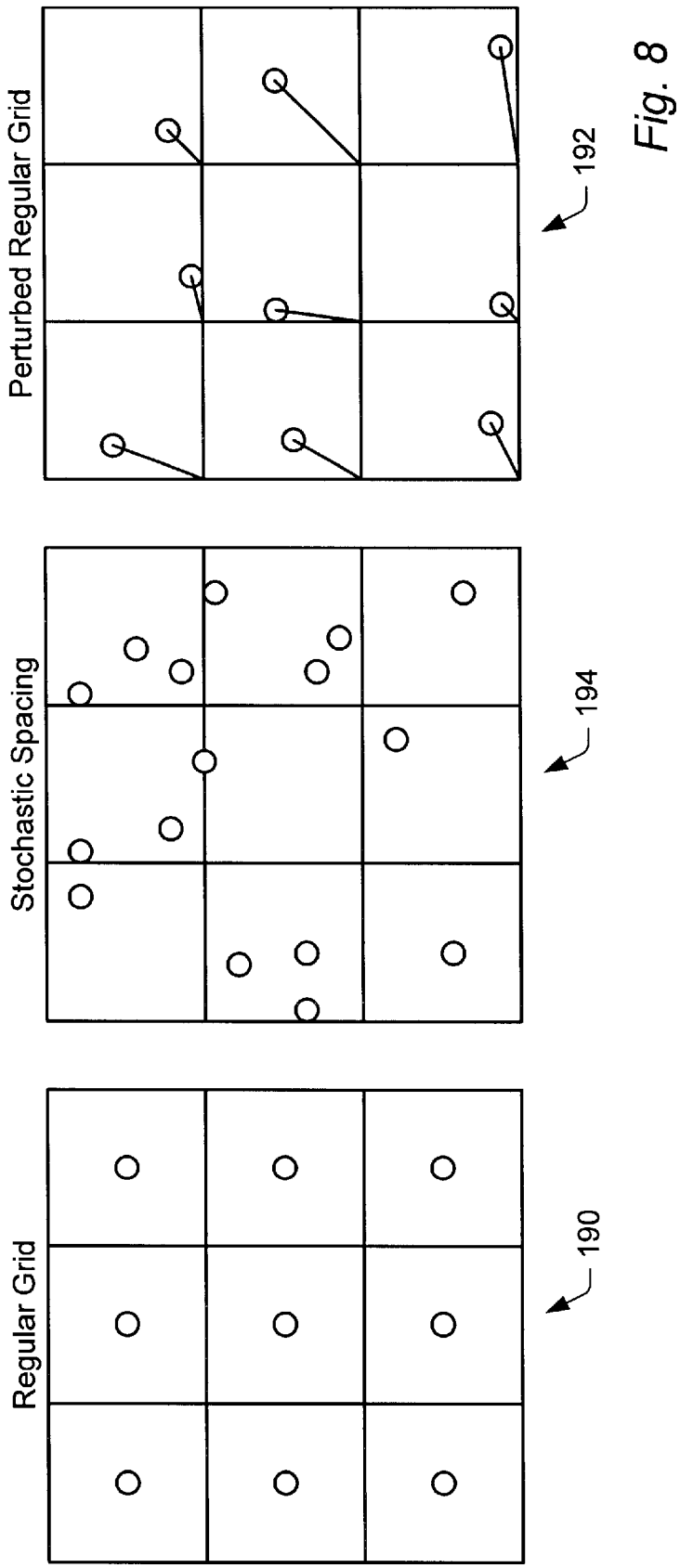
FIG. 8 is a diagram illustrating details of three different embodiments of sample positioning schemes.

FIG. 8 illustrates a number of different sample positioning schemes. In the regular positioning scheme 190, samples are positioned at fixed positions with respect to a regular grid which is superimposed on the 2-D viewport. For example, samples may be positioned at the center of the rectangles which are generated by the regular grid. More generally, any tiling of the 2-D viewport may generate a regular positioning scheme. For example, the 2-D viewport may be tiled with triangles, and thus, samples may be positioned at the centers (or vertices) of the triangular tiles. Hexagonal tilings, logarithmic tilings, and semi-regular tilings such as Penrose tilings are also contemplated.

In the perturbed regular positioning scheme 192, sample positions are defined in terms of perturbations from a set of fixed positions on a regular grid or tiling. In one embodiment, the samples may be displaced from their corresponding fixed grid positions by random x and y offsets, or by random angles (ranging from 0 to 360 degrees) and random radii (ranging from zero to a maximum radius). The offsets may be generated in a number of ways, e.g. by hardware based upon a small number of seeds, by reading a table of stored offsets, or by computing values of a pseudo-random function. Once again, perturbed regular grid scheme 192 may be based on any type of regular grid or tiling. Samples generated by perturbation with respect to a grid or hexagonal tiling may be particularly desirable due to the geometric properties of these configurations.

Stochastic sample positioning scheme 194 represents a third potential type of scheme for positioning samples. Stochastic sample positioning involves randomly distributing the samples across the 2-D viewport. Random positioning of samples may be accomplished through a number of different methods, e.g., using a random number generator such as an internal clock to generate pseudo-random numbers. Random numbers or positions may also be pre-calculated and stored in memory.

Figure 9:
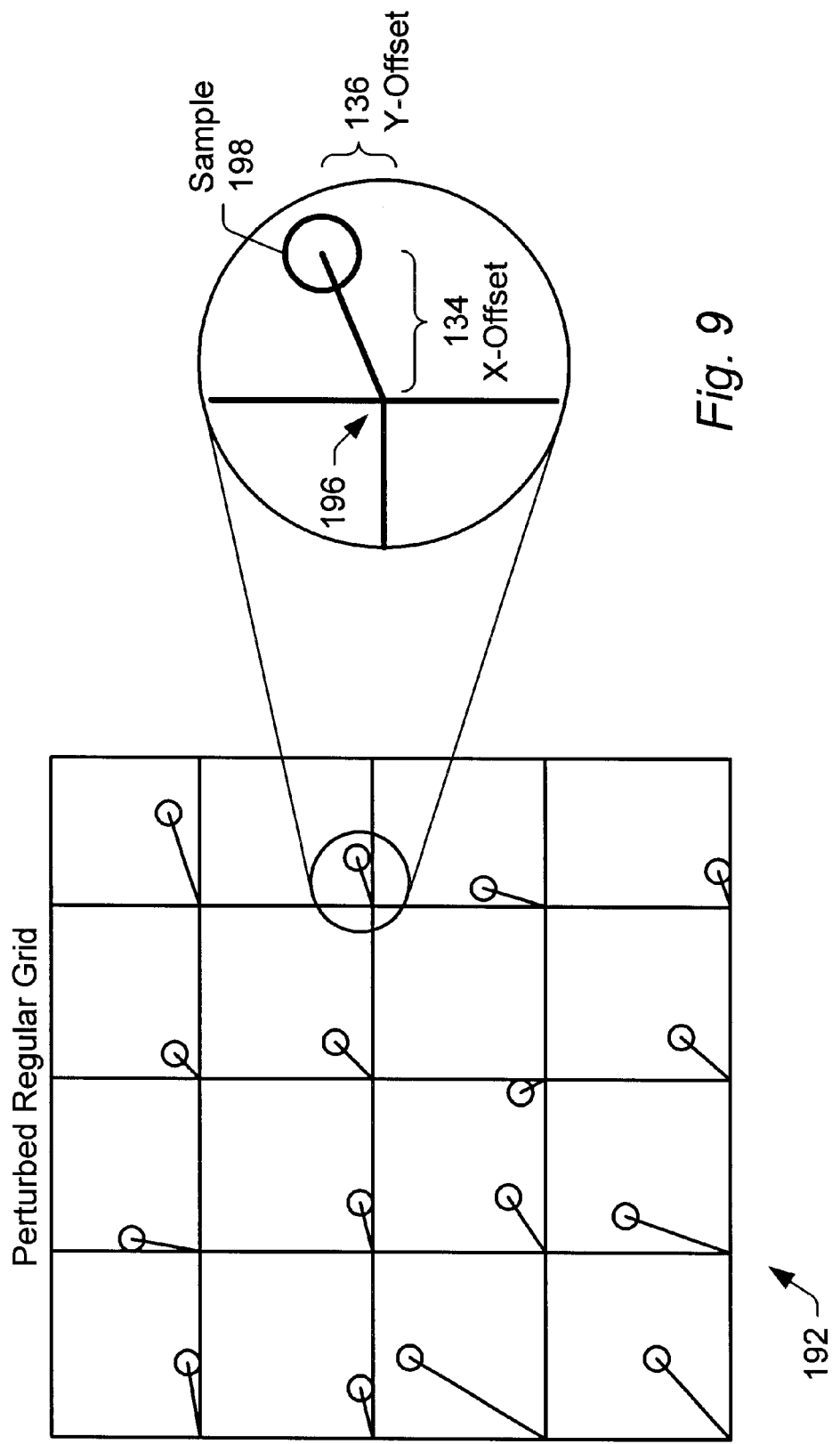
FIG. 9 is a diagram illustrating details of one embodiment of a sample positioning scheme.

Turning now to FIG. 9, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random offset may also be specified by an angle and radial distance. As with the previously disclosed embodiment that utilized angles and distances, x-offset 134 and y-offset 136 may be limited to a particular range of values, i.e. bounded by a minimum and maximum values.

Figure 10:
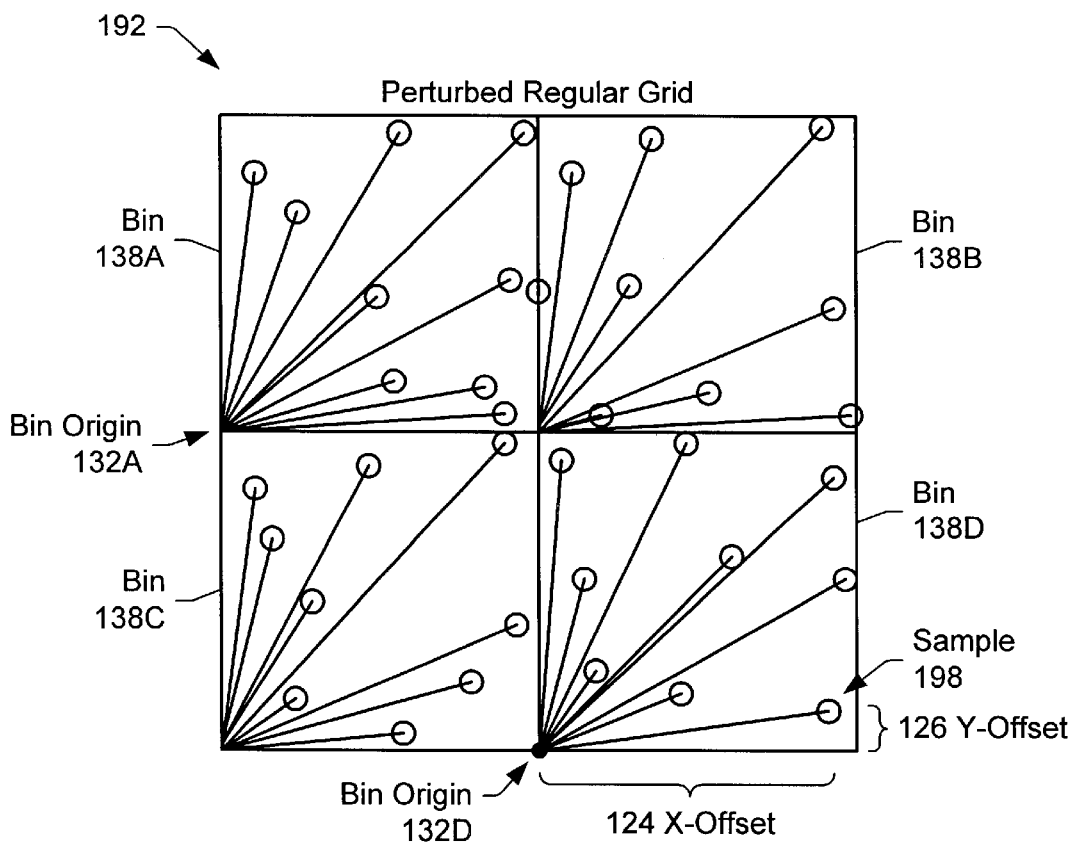
FIG. 10 is a diagram illustrating details of another embodiment of a sample positioning scheme.

Turning now to FIG. 10, details of another embodiment of perturbed regular grid scheme 192 are shown. In this embodiment, the samples are grouped into bins 138A–D. In this embodiment, each bin comprises nine samples. Different bin capacity values may be used in other embodiments. For example, in one embodiment, the bin capacity value (i.e. the number of sample per bin) may take any of the values 2, 3, 4, 5, 6, 8, 10 or 16.

In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 respectively with the x and y coordinates of the corner 132D of bin 138D. As previously noted, this may reduce the size of the sample position memory used in some embodiments.

Division of Labor by Columns

As discussed earlier, the 2-D viewport may be covered with an array of spatial bins. Each spatial bin may be populated with samples whose positions are determined by sample position memory 354. Each spatial bin corresponds to a memory bin in sample buffer 162. A memory bin stores the sample values (e.g. red, green, blue, z, alpha, etc.) for the samples that reside in the corresponding spatial bin. Sample-to-pixel calculation units 170 (also referred to as convolve units 170) are configured to read memory bins from sample buffer 162 and to generate pixel values by operating on sample values contained within the memory bins.

Figure 11:
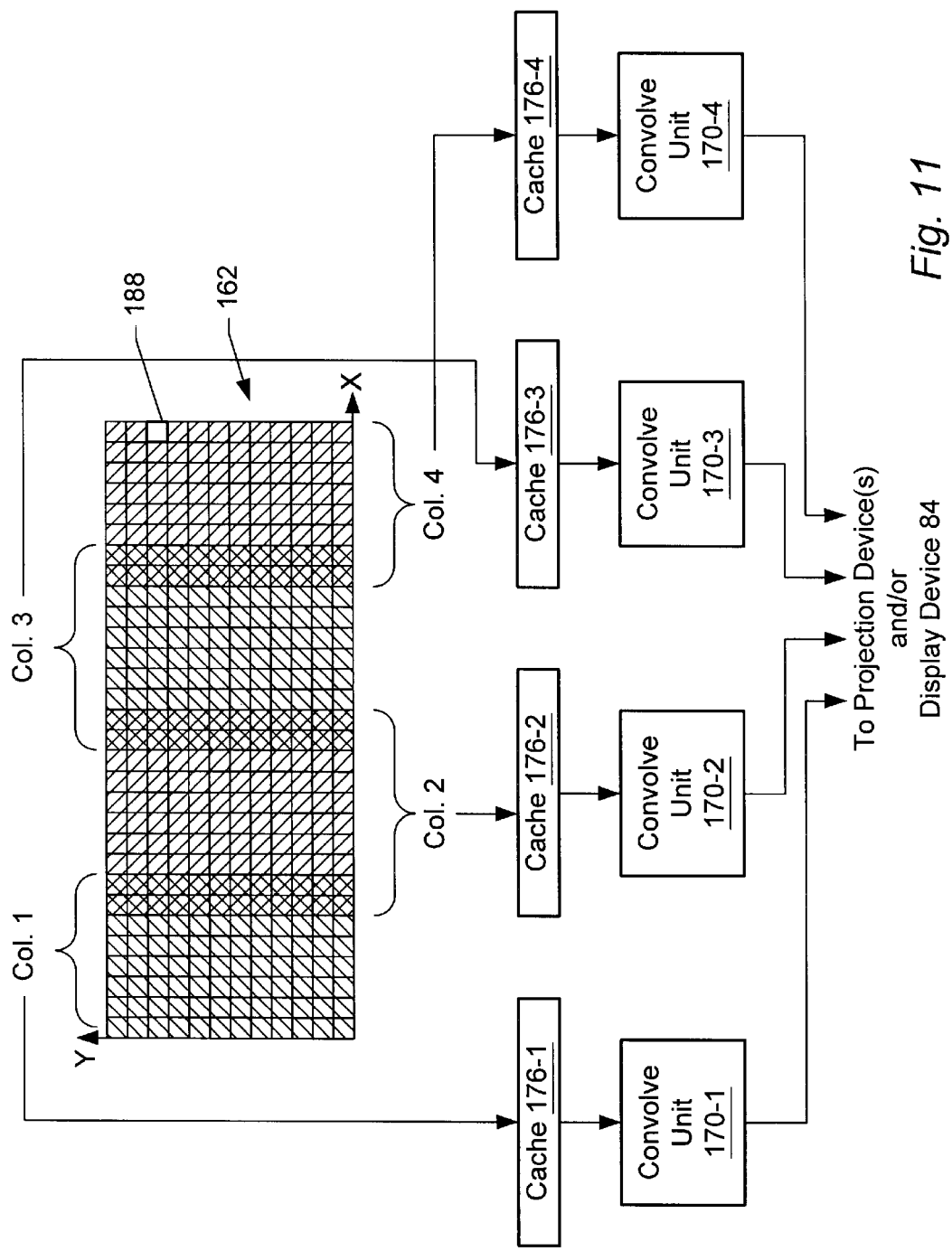
FIG. 11 is a diagram illustrating one embodiment of a parallel method for computing pixel values from sample values stored in sample buffer 162.

FIG. 11 illustrates one method for rapidly generating pixel values from the sample values stored in sample buffer 162. The spatial bins which cover the 2-D viewport may be organized into columns (e.g., Cols. 1–4). Each column comprises a two-dimensional subarray of spatial bins. The columns may be configured to horizontally overlap (e.g., by one or more spatial bins). Each of the sample-to-pixel calculation units 170-1 through 170-4 may be configured to access memory bins corresponding to one of the columns. For example, sample-to-pixel calculation unit 170-1 may be configured to access memory bins that correspond to the spatial bins of Column 1. The data pathways between sample buffer 162 and sample-to-pixel calculations unit 170 may be optimized to support this column-wise correspondence.

FIG. 11 shows four sample-to-pixel calculation units 170 for the sake of discussion. It is noted that graphics system 112 may include any number of the sample-to-pixel calculation units 170.

The amount of the overlap between columns may depend upon the horizontal diameter of the filter support for the filter kernel being used. The example shown in FIG. 11 illustrates an overlap of two bins. Each square (such as square 188) represents a single bin comprising one or more samples. Advantageously, this configuration may allow sample-to-pixel calculation units 170 to work independently and in parallel, with each of the sample-to-pixel calculation units 170 receiving and convolving samples residing in the memory bins of the corresponding column. Overlapping the columns may prevent visual bands or other artifacts from appearing at the column boundaries for any operators larger than a pixel in extent.

Furthermore, the embodiment of FIG. 11 may include a plurality of bin caches 176 which couple to sample buffer 162. In addition, each of bin caches 176 couples to a corresponding one of sample-to-pixel calculation units 170. Bin cache 176-I (where I takes any value from one to four) stores a collection of memory bins from Column I, and serves as a cache for sample-to-pixel calculation unit 170-I. Bin cache 176-I may have an optimized coupling to sample buffer 162 which facilitates access to the memory bins for Column I. Since the convolution calculation for two adjacent convolution centers may involve many of the same memory bins, bin caches 176 may increase the overall access bandwidth to sample buffer 162.

Figure 11A:
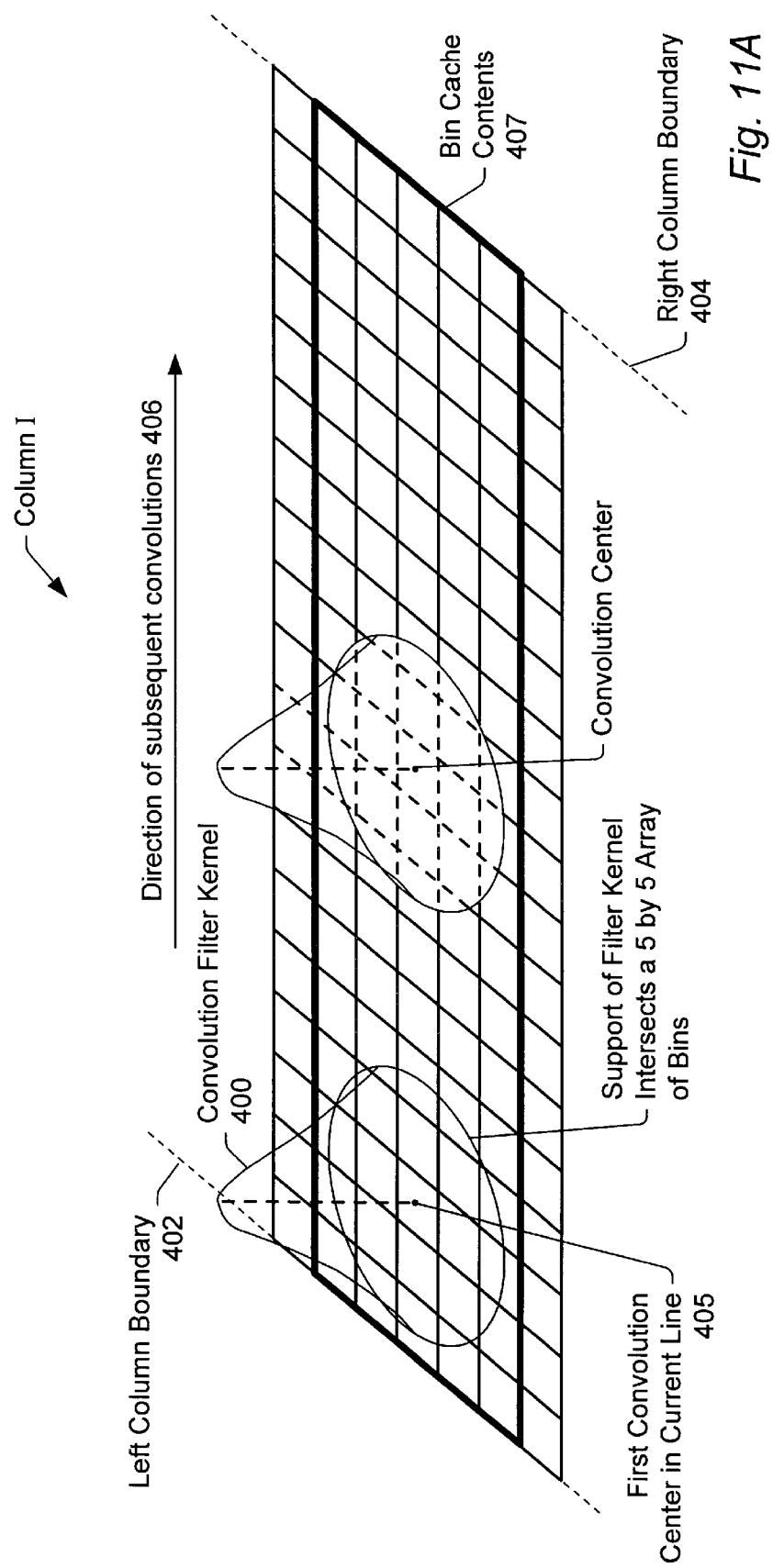
FIG. 11A is a diagram illustrating further details of the embodiment from FIG.

FIG. 11A illustrates more details of one embodiment of a method for reading sample values from super-sampled sample buffer 162. As the figure illustrates, the convolution filter kernel 400 travels across Column I (in the direction of arrow 406) to generate output pixel values, where index I takes any value in the range from one to four. Sample-to-pixel calculation unit 170-I may implement the convolution filter kernel 400. Bin cache 176-I may be used to provide fast access to the memory bins corresponding to Column I. Column I comprises a plurality of bin rows. Each bin row is a horizontal line of spatial bins which stretches from the left column boundary 402 to the right column boundary 404 and spans one bin vertically. In one embodiment, bin cache 176-I has sufficient capacity to store $N_L$ bin rows of memory bins. The cache line-depth parameter $N_L$ may be chosen to accommodate the support of filter kernel 400. If the support of filter kernel 400 is expected to span no more than $N_V$ bins vertically (i.e. in the Y direction), the cache line-depth parameter NL may be set equal to $N_L$ or larger. In the example of FIG. 11A, the filter support covers $N_v$=5 bins vertically, and the cache line-depth parameter $N_L$=6.

After completing convolution computations at a convolution center, convolution filter kernel 400 shifts to the next convolution center. Kernel 400 may be visualized as proceeding horizontally within Column I in the direction indicated by arrow 406. When kernel 400 reaches the right boundary 404 of Column I, it may shift down one or more bin rows, and then, proceed horizontally starting from the left column boundary 402. Thus the convolution operation proceeds in a scan line fashion, generating successive rows of output pixels for display.

Figure 12:
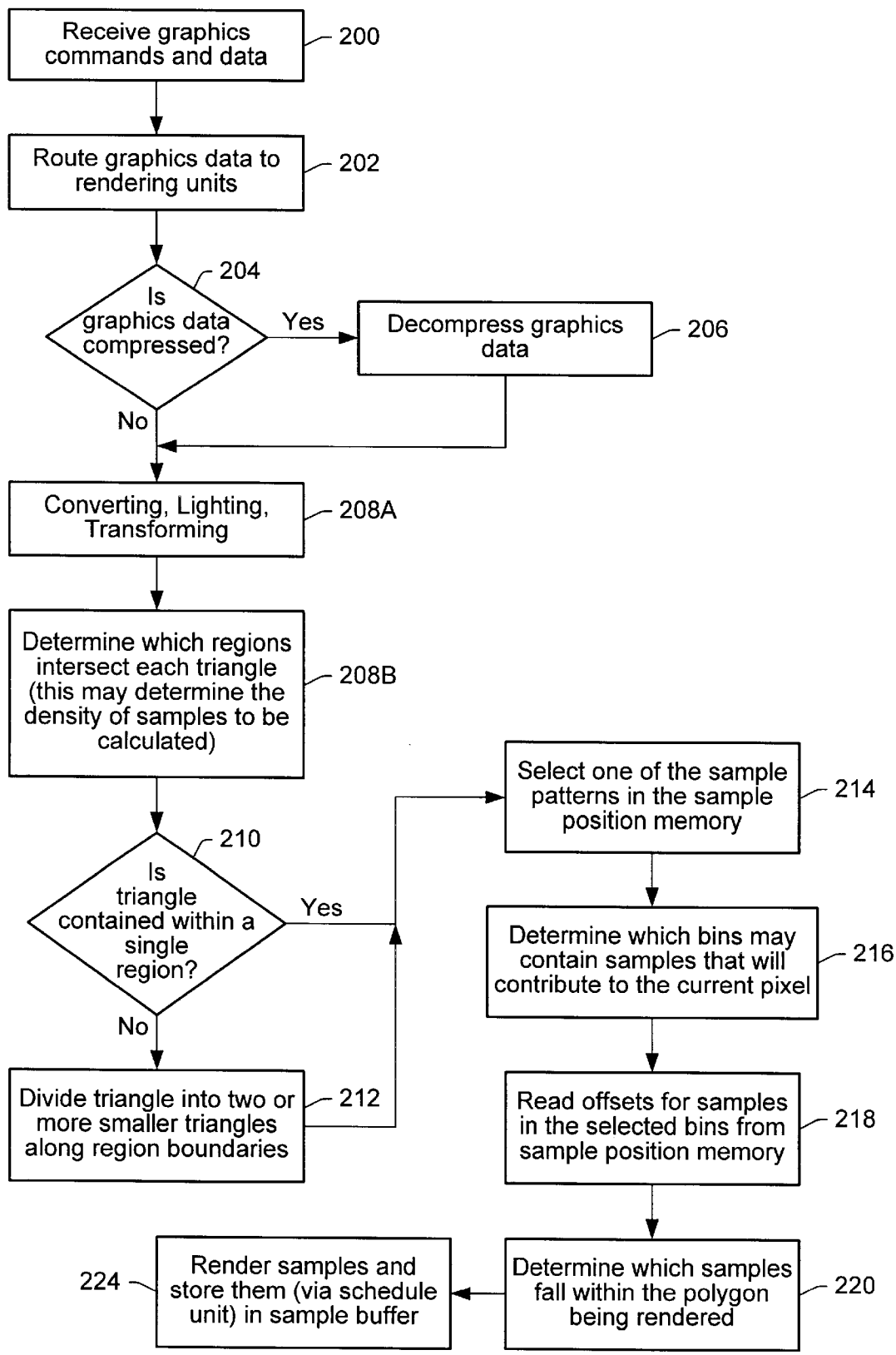
FIG. 12 is a flowchart illustrating one embodiment of a method for drawing samples into a super-sampled sample buffer.

FIG. 12—Rendering Samples into a Super-Sampled Sample Buffer

FIG. 12 is a flowchart of one embodiment of a method for drawing or rendering samples into a super-sampled sample buffer. Certain of the steps of FIG. 12 may occur concurrently or in different orders from the order depicted.

In step 200, graphics system 112 receives graphics commands and graphics data from the host CPU 102 or directly from system memory 106. In step 202, the instructions and data are routed to one or more of rendering units 150A–D. In step 204, rendering units 150A–D determine if the graphics data is compressed. If the graphics data is compressed, rendering units 150A–D decompress the graphics data into a useable format, e.g., triangles, as shown in step 206. Next, the triangles are processed and converted to an appropriate space for lighting and clipping prior to the perspective divide and transform to screen space (as indicated in step 208A).

If the graphics system implements variable resolution super-sampling, then the triangles are compared with a set of sample-density region boundaries (step 208B). In variable-resolution super-sampling, different regions of the 2-D viewport may be allocated different sample densities based upon a number of factors (e.g., the center of the attention of an observer on projection screen SCR as determined by eye or head tracking). If the triangle crosses a sample-density region boundary (step 210), then the triangle may be divided into two smaller polygons along the region boundary (step 212). The polygons may be further subdivided into triangles if necessary (since the generic slicing of a triangle gives a triangle and a quadrilateral). Thus, each newly formed triangle may be assigned a single sample density. In one embodiment, graphics system 112 may be configured to render the original triangle twice, i.e. once with each sample density, and then, to clip the two versions to fit into the two respective sample density regions.

In step 214, one of the sample positioning schemes (e.g., regular, perturbed regular, or stochastic) is selected from sample position memory 354. The sample positioning scheme will generally have been pre-programmed into the sample position memory 354, but may also be selected "on the fly".

In step 216, rendering units 150A–D may determine spatial bins which intersect with a current triangle based on the coordinates of the triangle vertices.

In step 218, the offsets dX and dY for the samples within these spatial bins are then read from sample position memory 354. In step 220, each sample's position is then calculated using the offsets dX and dY and the coordinates of the corresponding bin origin, and is compared against the triangle's edges to determine if the sample is within the triangle.

For each sample that is determined to be within the triangle, the rendering unit draws the sample by calculating the sample's color, alpha and other attributes. This may involve a lighting calculation and a spatial interpolation based upon the color and texture map information associated with the vertices of the triangle. Once the sample is rendered, it may be forwarded to schedule unit 154, which then stores the sample in sample buffer 162 (as indicated in step 224).

Note the embodiment of the rendering method described above is used for explanatory purposes only and is not meant to be limiting. For example, in some embodiments, the steps shown in FIG. 12 as occurring serially may be implemented in parallel. Furthermore, some steps may be reduced or eliminated in certain embodiments of the graphics system (e.g., steps 204–206 in embodiments that do not implement geometry compression, or steps 210–212 in embodiments that do not implement a variable resolution super-sampled sample buffer).

Figure 13:
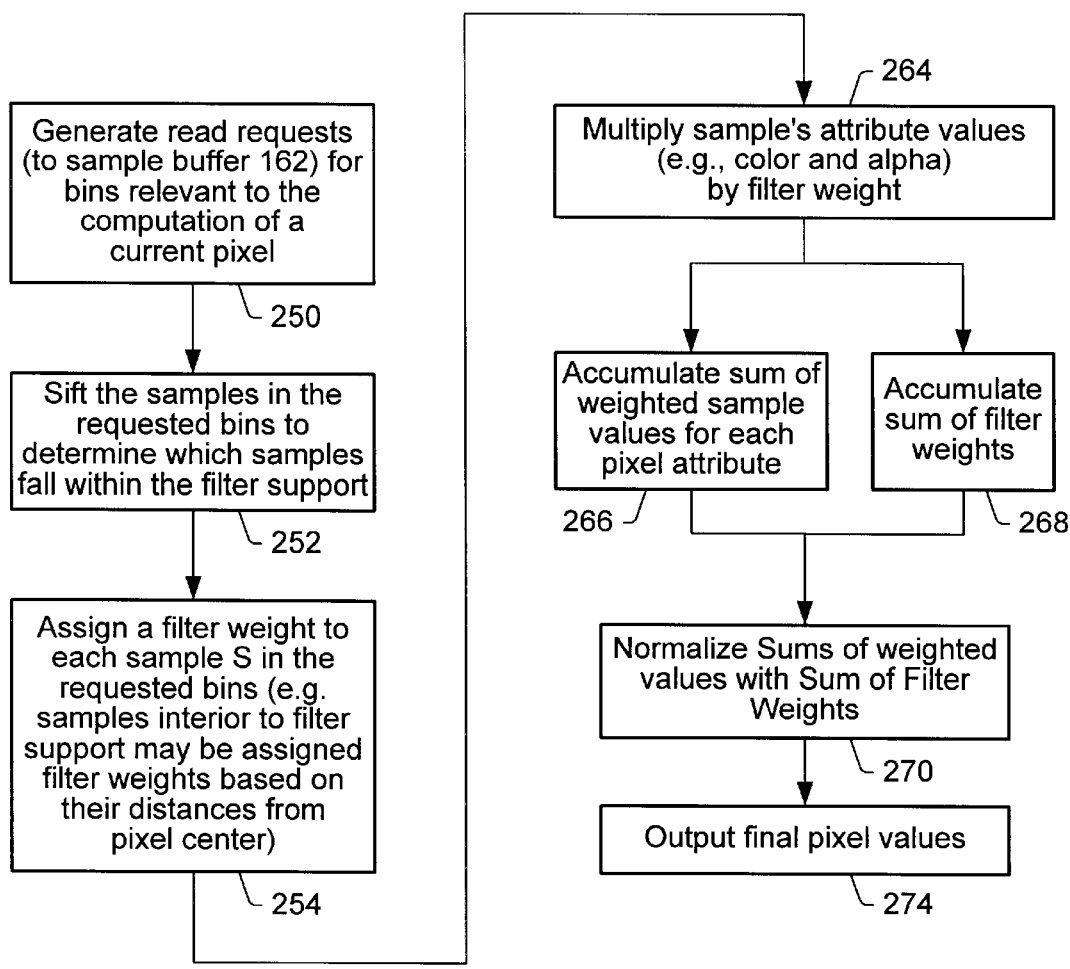
FIG. 13 is a diagram illustrating one embodiment of a method for calculating pixels from samples.

FIG. 13—Generating Output Pixel Values from Sample Values

FIG. 13 is a flowchart of one embodiment of a method for selecting and filtering samples stored in super-sampled sample buffer 162 to generate output pixel values. Each of the sample-to-pixel calculation units 170 may be configured to implement this method.

In step 250, sample-to-pixel calculation unit 170-I may generate read requests (to sample buffer 162) for bins relevant to the computation of a current pixel at the current pixel position $(X_p,Y_p)$. The set of requested bins cover the current filter support (i.e. the filter support centered at the current pixel position). For example, in one embodiment, the filter support may be programmably set equal to (a) a circular disk with radius up to two, or (b) a square with radius up to ½. Because a circular disk with radius two may intersect up to a 5 by 5 square of bins, the set of requested bins may be a 5 by 5 square of bins.

The requested bins may already reside in cache 176-I. Thus, cache 176-I may service some or all of the read requests. If the requested bins are not in cache 176-I, the requested bins are read from sample buffer 162 and cache 176-I is updated. Each bin comprises a set of one or more samples.

In step 252, sample-to-pixel calculation unit 170-I may sift the samples in the requested bins to determine which samples fall within the filter support. A valid bit associated with each sample is set based on the sample sift. Samples that fall within the filter support are marked as valid, and samples that fall outside the filter support are marked as invalid.

If the filter support is a circular disk, sample-to-pixel calculation unit 170-I may compute, for each sample S in the requested bins, a square radius $(r_S)^2$ from the pixel position $(X_P,Y_P)$ to the sample position $(X_S,Y_S)$ according to the relation $$(r_S)^2=(X_S-X_P)^2+(Y_s-Y_P)^2.$$

The sample positions $(X_S,Y_S)$ for the samples in the requested bins may be received from sample position memory 354.

The square radius may be compared to the square radius $(R_f)^2$ of the filter support. If the sample's square radius is less than (or alternatively, less than or equal to) the filter's square radius, the sample S is marked as being valid (i.e. inside the filter support).

If the filter support is a square with radius $R_f$ (i.e. side length $2R_f$), sample-to-pixel calculation unit 170-I may compute boundary coordinates for the support square according to the expressions $X_P+R_f$, $X_P-R_f$, $Y_P+R_f$, $Y_P-R_f$. The sample S is marked as being valid if the sample falls within the support square, i.e. if $X_P-R_f<X_S<X_P+R_f$ and $Y_P-R_f<Y_S<Y_P+R_f$ It is noted that any or all of the strict inequalities (<) in the system above may be replaced with permissive inequalities ($\leq$). Various embodiments are contemplated along these lines.

In step 254, sample-to-pixel calculation unit 170-I may assign a filter weight $C_S$ to each sample S in the requested bins. Samples that are marked as invalid may be assigned a filter weight equal to zero. Thus, invalid samples make a null contribution to the values of the current pixel. In a box filtering mode, each valid sample is assigned the same filter weight value (e.g. $C_S=1$). In a radially-symmetric filtering mode, each valid sample is assigned a filter weight value $C_S$ based on its radial distance with respect to the pixel position. In one embodiment, a normalized square radius $U_S$ may be computed for each valid sample S by multiplying the sample's square radius by the reciprocal of the filter's square radius:

$$U_s = (r_s)^2 \frac{1}{(R_f)^2}.$$

The normalized square radius $U_S$ may be used to access a coefficient lookup table. The coefficient lookup table may store filter weights indexed by the normalized square radius.

Because the entries in the coefficient lookup table are indexed according to normalized square distance, the filter weights need not be updated when the radius $R_f$ of the filter support changes. The filter weights and the filter radius may be modified independently.

Host software (running on host CPU 102) may store the reciprocal of the filter's square radius in a register internal to sample-to-pixel calculation unit 170-I. Thus, sample-to-pixel calculation unit 170-I may advantageously generate the normalized square radius with a multiplication and avoid the reciprocal computation. The reciprocal of the filter's square radius may be stored into the internal register at system initialization time.

Instead of comparing $(r_S)^2$ to $(R_f)^2$ to determine whether a sample falls inside or outside the filter support, sample-to-pixel calculation unit 170-I may compare the value $U_s$ to one. Thus, the inclusion-exclusion test may be deferred until after the computation of normalized square distance $U_s$.

The coefficient lookup table may be implemented in RAM and may be programmable by host software. Thus, the filter function (i.e. the filter kernel) used by the sample-to-pixel calculation unit 170-I may be changed as needed or desired. For example, host software may program the coefficient lookup table at system initialization time. In some embodiments, the coefficient lookup tables may be programmable on a per-frame basis. The filter coefficients may be varied to compensate for known shortcomings of the display/projection device or to accommodate the user's personal preferences.

In one set of embodiments, sample-to-pixel calculation unit 170-I may include multiple coefficient lookup tables, and may be configured to access different ones of the coefficient lookup tables depending on the location of the pixel position in the rendering space. Thus, sample-to-pixel calculation unit 170-I may vary the filter function on a screen area basis within a frame, or on a per-output pixel basis.

In step 264, sample-to-pixel calculation unit 170-I may multiply each sample's attribute values (e.g. red, green, blue, $\alpha$) by the sample's filter weight $C_s$ to produce weighted attribute values.

In step 266, sample-to-pixel calculation unit 170-I may generate a sum of the weighted red values, a sum of the weight blue values, a sum of the weighted green values, a sum of the weighted $\alpha$ values, i.e. one sum per attribute. Sample-to-pixel calculation unit 170-I may include one or more adder trees to implement these summations. In one embodiment, these multiple summations may be performed in parallel. In another embodiment, these summations are partitioned into two or more groups, and summations within a group are performed in parallel.

For more information on the construction of adder trees for sample filtering, please refer to U.S. Provisional Application No. 60/215,030 entitled "Graphics System with an Improved Filtering Adder Tree" filed on Jun. 29, 2000 which is hereby incorporated by reference.

In step 268, the filter weights $C_s$ themselves may be added to a sum E of filter weights. Step 268 may be performed in parallel with some or all the summations of step 266.

After all samples of the requested bins have been processed, in step 270A, sample-to-pixel calculation unit 170-I may compute the reciprocal of the sum E of filter weights. The reciprocal (1/E) may be computed by lookup (with or without interpolation) in a reciprocal table (e.g. a ROM table). In step 270B, each of the sums of weighted attribute values may be multiplied by the reciprocal value (1/E). The results of these multiplications are referred to herein as normalized pixel attributes. Steps 270A and 270B are collectively referred to as step 270.

It is noted that the number of samples which fall within the filter support may vary as the filter center moves within the 2-D viewport. The normalization step 270 compensates for the variable gain which is introduced by this nonuniformity in the number of included samples, and thus, prevents the computed pixel values from appearing too bright or too dark due to the sample number variation. Finally, as indicated in step 274, the normalized pixel attributes may be output for gamma correction, digital-to-analog conversion (if necessary) and presentation to a display device.

In one alternative embodiment, in the radially-symmetric filtering mode, sample-to-pixel calculation unit 170-I may be configured to compute a radial distance of each valid sample with respect to the pixel position by taking the square root of the sample's square radius. (The square root may be implemented by lookup in a square root table or by computation of a numerical expression such as a Taylor series.) A normalized radial distance for the sample may be computed by multiplying the sample's radial distance by the reciprocal of the filter radius $R_f$. The normalized radial distance may be used to access a coefficient lookup table which is indexed according to normalized radial distance.

As described above, the attribute summations may include zero terms corresponding to the invalid samples. (Recall that the invalid samples are assigned a filter weight of zero.) Alternatively, the coefficient multiplications and following summations may be performed only on valid samples. Thus, the invalid samples may be simply ignored.

As an alternative to table lookup, sample-to-pixel calculation unit 170-I may use specialized hardware (e.g., multipliers and adders) to evaluate the filter function. (i.e. filter kernel) based on stored parameters (e.g. polynomial coefficients) defining the filter function. The evaluated filter function values serve as the sample filter weights.

In some embodiments, a separate filter function may be used for filtering each color. Thus, sample-to-pixel calculation units 170 may include a separate table of filter weights for each color. Alternatively, sample-to-pixel calculation units 170 may include a separate function evaluation hardware unit for each color.

In some situations; a filter function may not be expressible as a function of Euclidean distance with respect to the filter center. For example, a pyramidal tent filter is not expressible as a function of Euclidean distance from the filter center. Thus, filter weights may be tabulated (or computed) in terms of X and Y sample-displacements, or some non-Euclidean distance, with respect to the filter center.

Figure 14:
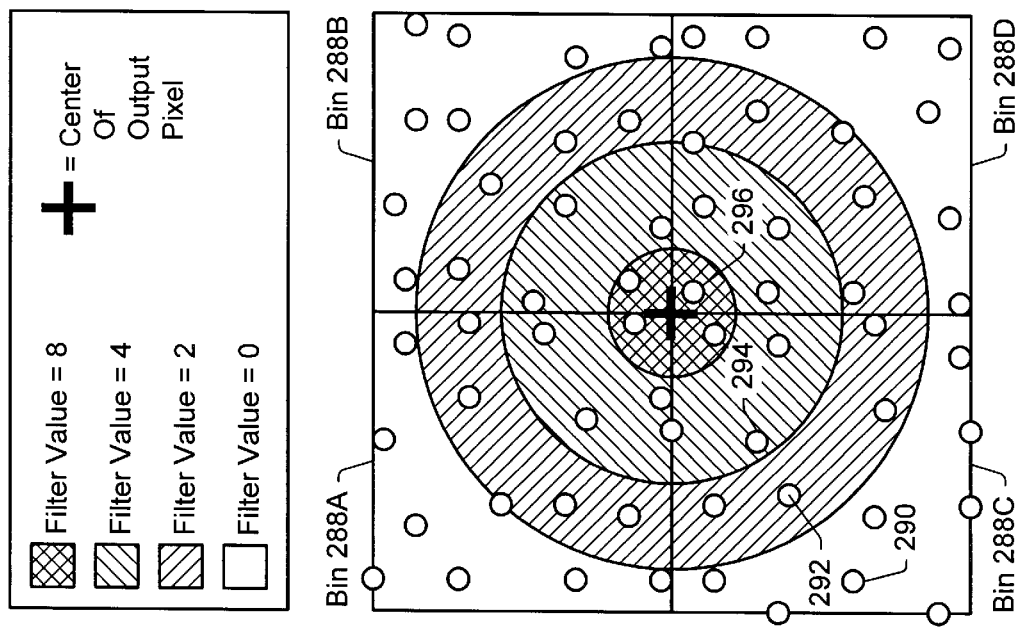
FIG. 14 is a diagram illustrating details of one embodiment of a pixel convolution for an example set of samples.

FIG. 14—Example Output Pixel Convolution

FIG. 14 illustrates a simplified example of an output pixel convolution with a filter function which is radially symmetric and piecewise constant. As the figure shows, four bins 288A–D contain samples that contribute to the output pixel convolution. In this example, the center of the current output pixel is located at the shared corner of bins 288A–288D. Each bin comprises sixteen samples, and an array of four bins (2×2) is filtered to generate the attribute values (red, green, blue, alpha) for the output pixel. Since the filter function is radially symmetric, the distance (or square distance) of each sample from the pixel center determines the filter value which will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter radius, and thus receives a filter value of 0. Thus, sample 290 will not contribute to the computed attribute values for the output pixel.

Because the filter function is a decreasing function of distance from the pixel center, samples close to the pixel center contribute more to the computed attribute values than samples farther from the pixel center.

Example attribute values for samples 290–296 are illustrated in boxes 300–306. In this example, each sample comprises red, green, blue and alpha values, in addition to the sample's positional data. Block 310 illustrates the calculation of each pixel attribute value prior to normalization. As previously noted, the filter values may be summed to obtain a normalization value 308. Normalization value 308 is used to divide out the unwanted gain arising from the non-constancy of the number of samples captured by the filter support. Block 312 illustrates the normalization process and the final normalized pixel attribute values.

The filter presented in FIG. 14 has been chosen for descriptive purposes only and is not meant to be limiting. A wide variety of filters may be used for pixel value computations depending upon the desired filtering effect(s), e.g., filters such as the box filter, the tent filter, the cylinder filter, the cone filter, the Gaussian filter, the Catmull-Rom filter, the Mitchell-Netravali filter or any windowed approximation of the sinc filter. Furthermore, the support of the filters used for the pixel value convolutions may be circular, elliptical, rectangular (e.g. square), triangular, hexagonal, etc.

The piecewise constant filter function shown in FIG. 14 with four constant regions is not meant to be limiting. For example, in one embodiment the convolution filter may have a large number of regions each with an assigned filter value. The filter values may be positive, negative or zero. In another embodiment, the convolution filter may be represented by a parameterized expression which is computed for each sample based on the sample's distance (or X and Y displacements) from the pixel center. Also note that floating point values may be used to represent sample distances or square distances for increased precision.

Full-Screen Anti-aliasing

In one embodiment, graphics system 112 may be configured to implement full-screen anti-aliasing by stochastically distributing up to sixteen samples per output pixel in the 2D viewport window, and filtering the samples with a convolution filter.

Figure 15:
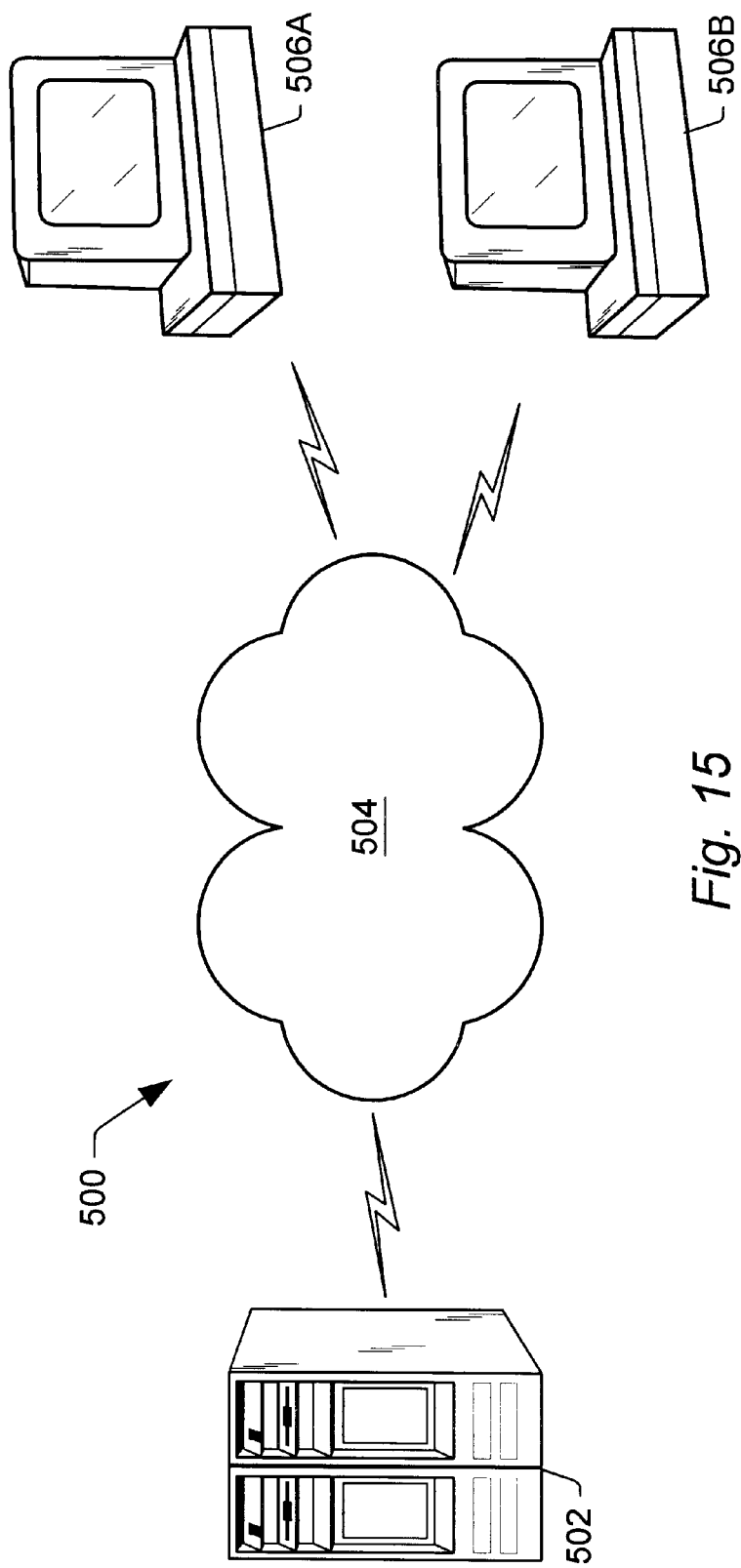
FIG. 15 is a diagram of one embodiment of a computer network connecting multiple computers.

Computer Network—FIG. 15

Referring now to FIG. 15, a computer network 500 is shown comprising at least one server computer 502 and one or more client computers 506A–N. One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary) and then render the geometry data. The rendered image is then displayed on the client's display device. The clients render the geometry data and display the image using super-sampled sample buffer and real-time filter techniques described above. In another embodiment, the compressed 3-D geometry data may be transferred between client computers 506.

12-bit Effective Linear Output

While 12-bit (linear light) color depth (i.e., 12-bits of data for each of red, green, and blue) is considered ideal in many embodiments, possible limitations in sample memories 162 may limit the storage space per sample to a lesser value (e.g., 10-bits per color component). In one embodiment, graphics system 112 may be configured to dither samples from 12-bits to 10-bits before they are stored in sample buffer 162. During the final anti-aliasing computation in sample-to-pixel calculation units 170A–D, the additional bits may effectively be recovered. After normalization, the resulting pixels may be accurate to 12-bits (linear light). The output pixels may be converted to nonlinear light, and after the translation, the results may be accurate to 10 bits (non-linear light).

Alpha Blending, Fogging, and Depth-Cueing

Alpha blending is a technique that controls the transparency of an object, allowing realistic rendering of translucent surfaces such as glass or water. Additional atmospheric effects that are found in rendering engines include fogging and depth cueing. Both of these techniques obscure an object as it moves away from the viewer. Blur is also somewhat related and may be implemented by performing low-pass filtering during the filtering (e.g., by using a wider filter function) by sample-to-pixel calculation units 170A–D. An alpha value may be generated that can be used to blend the current sample into the sample buffer.

In the embodiments described above, a set of one or more sample-to-pixel calculation units are configured to read samples from a sample buffer (e.g. sample buffer 162) and perform real-time filtering of samples to generate a stream of pixels. The pixel stream is preferably not buffered into frames after its generation in the sample-to-pixel calculation units. In other words, there is preferably no frame buffer after the sample-to-pixel calculation units. The display device which receives the output video signal may include a frame buffer but this is not considered part of graphics system 112.

In contrast, the embodiments of graphics system 112 described below include a hardware accelerator which generates samples in response to received graphics data, filters the samples to generate pixels, and stores the pixels into a frame buffer. A video output processor reads the pixels from frame buffer and converts the pixels into a video output signal. Thus, the embodiments described below preferably involve the buffering of pixel data into frames prior to video signal generation.

Figure 16:
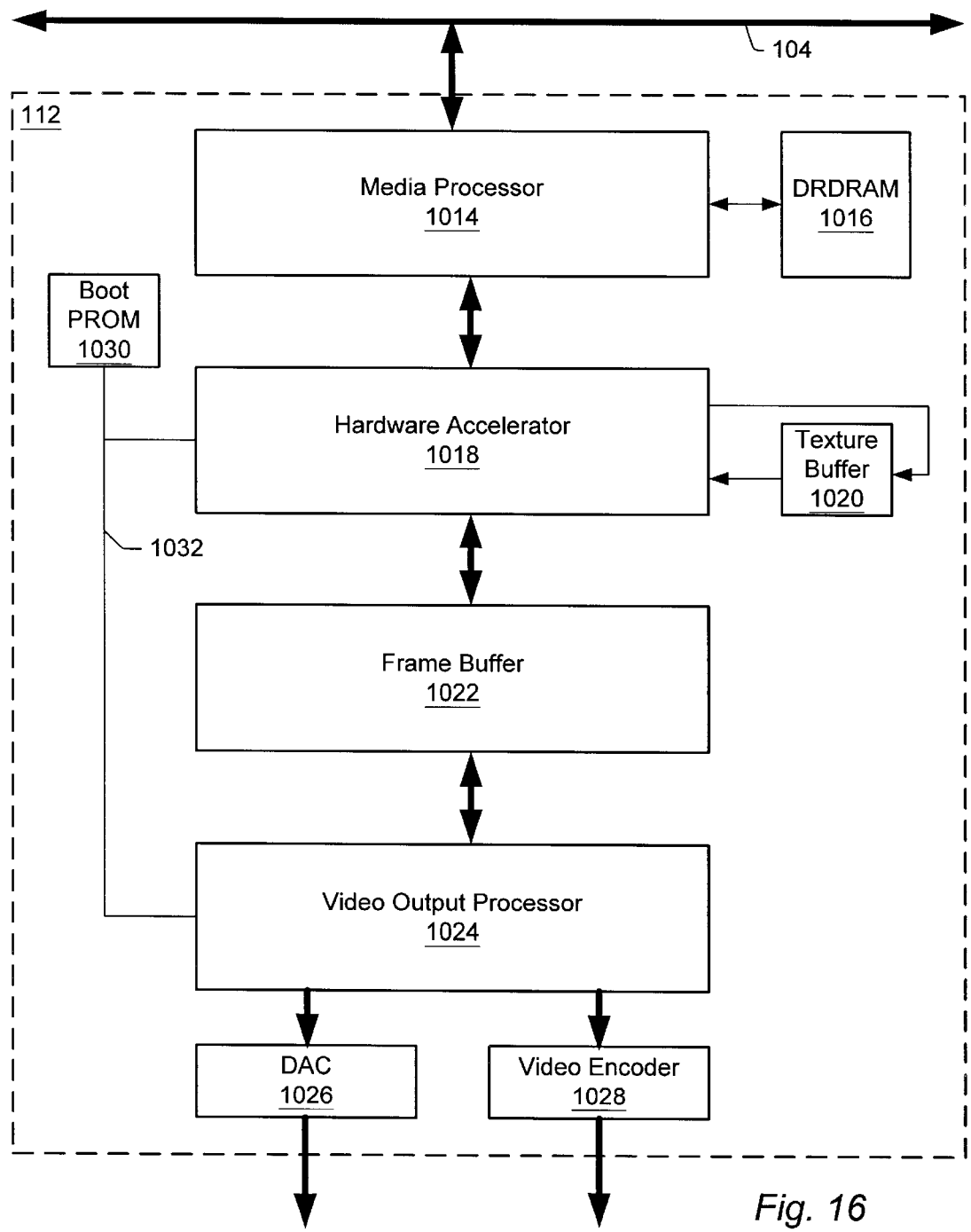
FIG. 16 is a block diagram for one embodiment of a graphics system configured to generate one or more video streams in response to received graphics data.

Another Embodiment for Graphics System 112—FIG. 16

Referring now to FIG. 16, a functional block diagram illustrating another embodiment of graphics system 112 is shown. Note that many other embodiments of graphics system 112 are possible and contemplated. Graphics system 112 may comprise one or more media processors 1014, one or more hardware accelerators 1018, one or more texture buffers 1020, one or more frame buffers 1022, and one or more video output processors 1024. Graphics system 112 may also comprise one or more output devices such as digital-to-analog converters (DACs) 1026, video encoders 1028, flat-panel-display drivers (not shown), and/or video projectors (not shown). Media processor 1014 and/or hardware accelerator 1018 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the hardware accelerator may be implemented in software.

In some embodiments, media processor 1014 may be implemented in one integrated circuit, and hardware accelerator 1018 may be implemented in a second integrated circuit. In other embodiments, media processor 1014 and hardware accelerator 1018 may be comprised within the same integrated circuit.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 17:
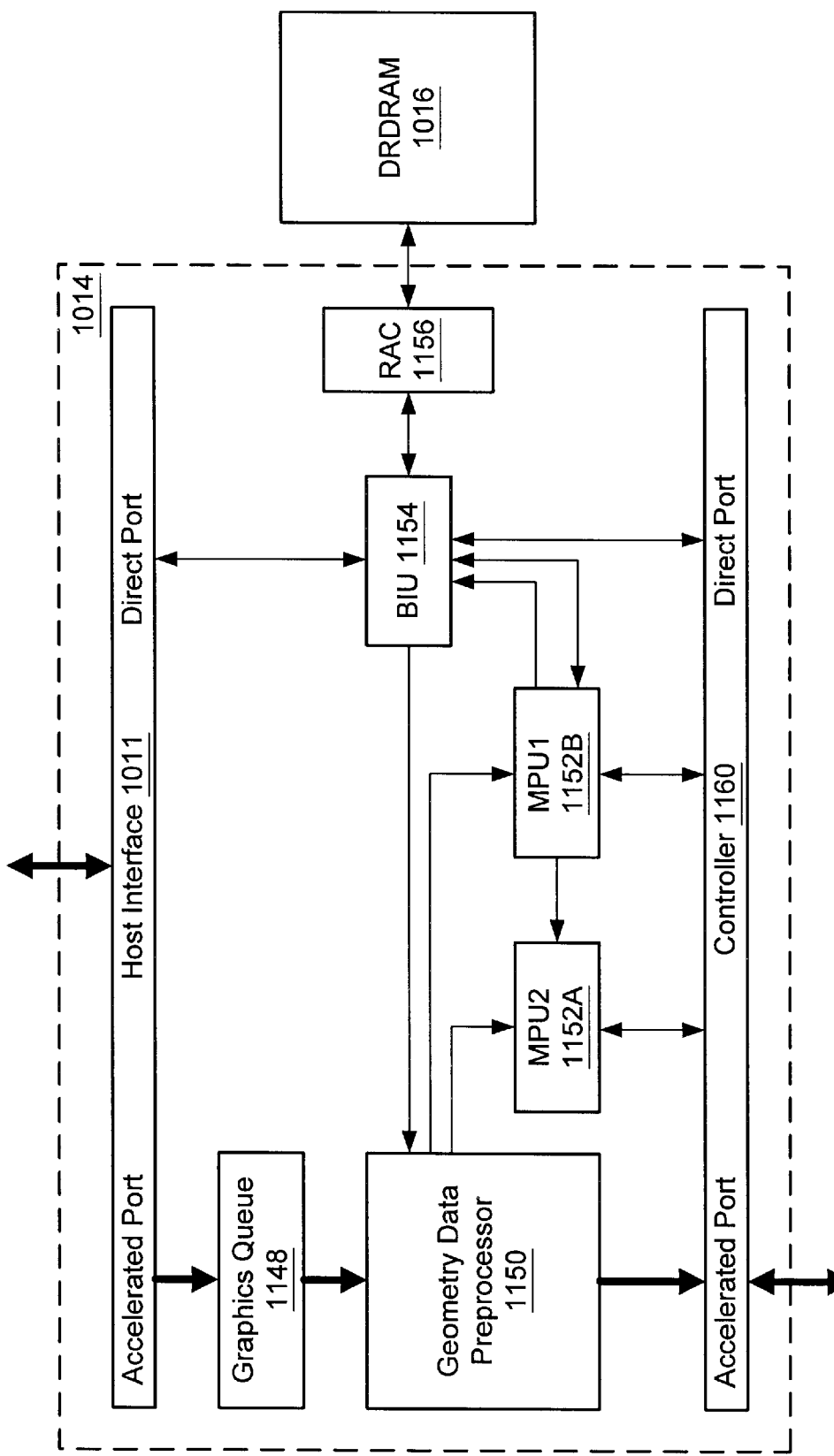
FIG. 17 illustrates one embodiment of media processor 1014.

Media Processor—FIG. 17

FIG. 17 shows one embodiment of media processor 1014. As shown, media processor 1014 operates as the interface between graphics system 112 and computer system 80 by controlling the transfer of data between graphics system 112 and computer system 80. In some embodiments, media processor 1014 may also be configured to perform transform, lighting, and/or other general-purpose processing on graphical data.

As illustrated, media processor 1014 may be configured to receive graphical data via host interface 1011. A graphics queue 1148 may be included in media processor 1014 to buffer the graphical data received via the accelerated port of host interface 1011. The received graphics data may comprise a stream of vertices corresponding to graphics primitives such as polygons, lines, dots, etc.

In one embodiment, media processor 1014 may also include a geometry data preprocessor 1150 and one or more microprocessor units (MPUs) 1152. MPUs 1152 may be configured to perform vertex transform and lighting calculations and programmable functions and to send results to hardware accelerator 1018. MPUs 1152 may also have read/write access to texels (i.e. the smallest addressable unit of a texture map, which is used to "wallpaper" a three-dimensional object) and pixels in the hardware accelerator 1018. Geometry data preprocessor 1150 may be configured to decompress geometry, to convert and format vertex data, to dispatch vertices and instructions to the MPUs 1152, and to send vertex and attribute tags or register data to hardware accelerator 1018.

As shown, media processor 1014 may have other possible interfaces, including an interface to a memory. For example, as shown, media processor 1014 may include direct Rambus interface 1156 to a direct Rambus DRAM (DRDRAM) 1016. A memory such as DRDRAM 1016 may be used for program and data storage for MPUs 1152. DRDRAM 1016 may also be used to store display lists and/or vertex texture maps.

Media processor 1014 may also include interfaces to other functional components of graphics system 112. For example, media processor 1014 may have an interface to another specialized processor such as hardware accelerator 1018. In the illustrated embodiment, controller 1160 includes an accelerated port path that allows media processor 1014 to control hardware accelerator 1018. Media processor 1014 may also include a direct interface, such as bus interface unit (BIU) 1154, which provides a direct port path to memory 1016 and to hardware accelerator 1018 and video output processor 1024 via controller 1160.

Figure 18:
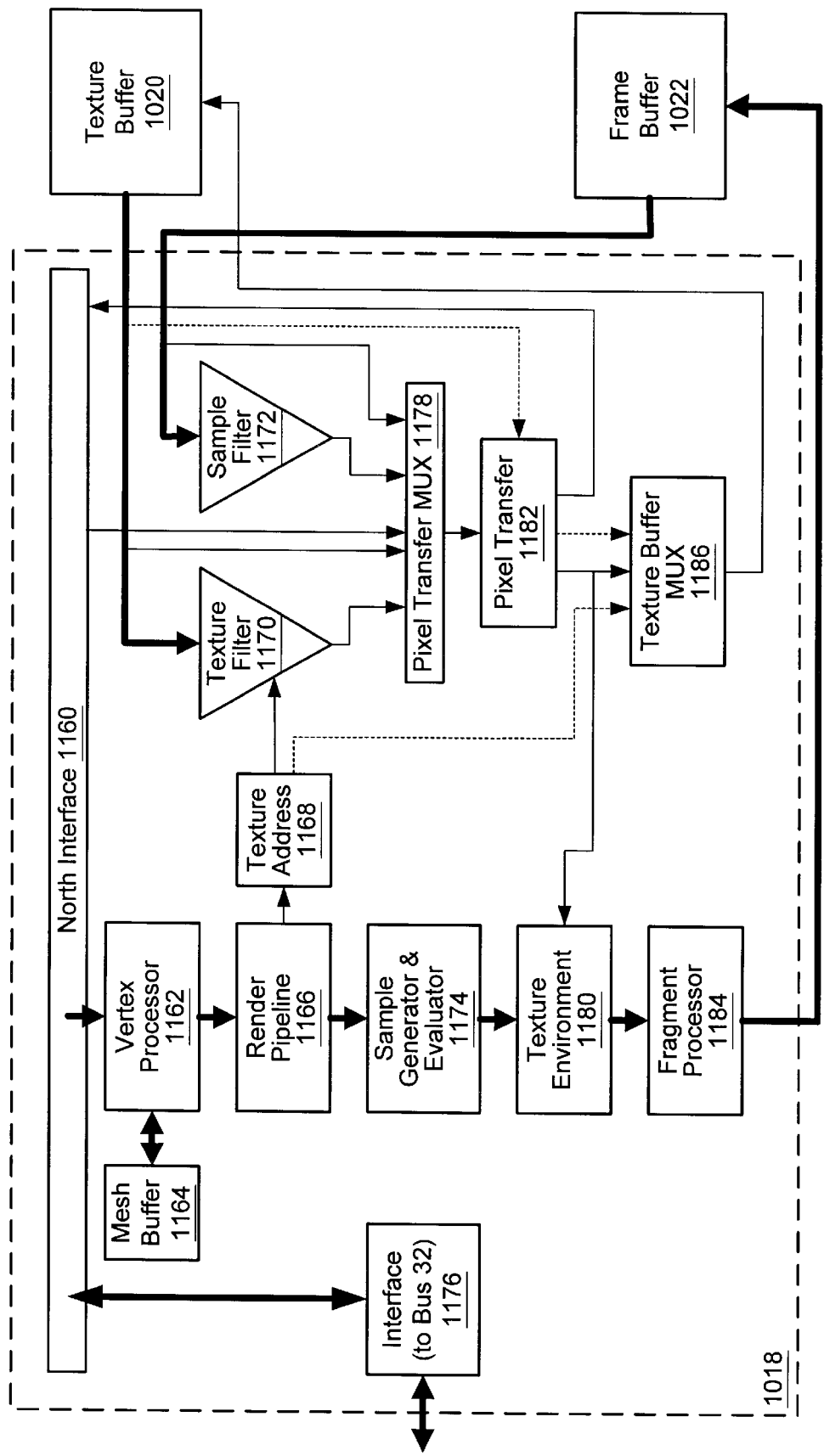
FIG. 18 illustrates one embodiment of hardware accelerator 1018.

Hardware Accelerator—FIG. 18

One or more hardware accelerators 1018 may be configured to receive graphics instructions and data from media processor 1014 and then to perform a number of functions on the received data according to the received instructions. For example, hardware accelerator 1018 may be configured to perform rasterization, 2D or 3D texturing, pixel transfers, imaging, fragment processing, clipping, depth cueing, transparency processing, viewport set-up, and/or screen space rendering of various graphics primitives occurring within the graphics data.

Screen-space rendering refers to the computation of samples for primitives such as triangles, lines, dots, etc. Samples are points having color information but no real area. Samples allow hardware accelerator 1018 to "super-sample," or calculate more than one sample per pixel. Super-sampling may result in a higher quality image.

Hardware accelerator 1018 may also include several interfaces. For example, in the illustrated embodiment, hardware accelerator 1018 has four interfaces. Hardware accelerator 1018 has an interface 1160 (referred to as the "North Interface") to communicate with media processor 1014. Hardware accelerator 1018 may also be configured to receive commands from media processor 1014 through this interface. Additionally, hardware accelerator 1018 may include an interface 1176 to bus 1032. Bus 1032 may connect hardware accelerator 1018 to boot PROM 1030 and/or video output processor 1024.

Hardware accelerator 1018 may also include an interface to a texture buffer 1020. For example, hardware accelerator 1018 may interface to texture buffer 1020 using an eight-way interleaved texel bus that allows hardware accelerator 1018 to read from and write to texture buffer 1020. Hardware accelerator 1018 may also interface to a frame buffer 1022. For example, hardware accelerator 1018 may be configured to read from and/or write to frame buffer 1022 using a four-way interleaved pixel bus.

The vertex processor 1162 may be configured to use the vertex tags received from the media processor 1014 to perform ordered assembly of the vertex data from the MPUs 1152. Vertices may be saved in and/or retrieved from a mesh buffer 1164.

The render pipeline 1166 may be configured to receive a stream of vertices defining primitives such as triangles and to convert the primitives into fragments. The render pipeline 1166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 1166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 1174 may be configured to generate samples from the fragments output by the render pipeline 1166 and to determine which samples are inside the rasterization edge. Sample positions may be defined in loadable tables to enable stochastic sampling patterns.

Hardware accelerator 1018 may be configured to write textured fragments from 3D primitives to frame buffer 1022. The render pipeline 1166 may send pixel tiles defining r, s, t and w to the texture address unit 1168. The texture address unit 1168. may determine the set of neighboring texels that are addressed by the fragment(s), as well as the interpolation coefficients for the texture filter, and write texels to the texture buffer 1020. The texture buffer 1020 may be interleaved to obtain as many neighboring texels as possible in each clock. The texture filter 1170 may perform bilinear, trilinear or quadlinear interpolation. The pixel transfer unit 1182 may also scale and bias and/or lookup texels. The texture environment 1180 may apply texels to samples produced by the sample generator 1174. The texture environment 1180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 1178 controls the input to the pixel transfer unit 1182. The pixel transfer unit 1182 may selectively unpack pixel data received via north interface 1160, select channels from either the frame buffer 1022 or the texture buffer 1020, or select data received from the texture filter 1170 or sample filter 1172.

The pixel transfer unit 1182 may be used to perform scale, bias, and/or color matrix operations, color lookup operations, histogram operations, accumulation operations, normalization operations, and/or min/max functions. Depending on the source of and operations performed on the processed data, the pixel transfer unit 1182 may then output the data to the texture buffer 1020 (via the texture buffer MUX 1186), the frame buffer 1022 (via the texture environment unit 1180 and the fragment processor 1184), or to the host (via north interface 1160). For example, in one embodiment, when the pixel transfer unit 1182 receives pixel data from the host via the pixel transfer MUX 1178, the pixel transfer unit 1182 may be used to perform a scale and bias or color matrix operation, followed by a color lookup or histogram operation, followed by a min/max function. The pixel transfer unit 1182 may then output data to either the texture buffer 1020 or the frame buffer 1022.

Fragment processor 1184 may be used to perform standard fragment processing operations such as the OpenGL fragment processing operations. For example, the fragment processor 1184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 1020

Texture buffer 1020 may include several SDRAMs. Texture buffer 1020 may be configured to store texture maps, image processing buffers, and accumulation buffers for hardware accelerator 1018. Texture buffer 1020 may have many different capacities (e.g., depending on the type of SDRAM included in texture buffer 1020). In some embodiments, each pair of SDRAMs may be independently row and column addressable.

Frame Buffer 1022

Graphics system 112 may also include a frame buffer 1022. In one embodiment, frame buffer 1022 may include multiple 3DRAM64s. Frame buffer 1022 may be configured as a display pixel buffer, an offscreen pixel buffer, and/or a supersample buffer. Furthermore, in one embodiment, certain portions of frame buffer 1022 may be used as a display pixel buffer, while other portions may be used as an offscreen pixel buffer and supersample buffer.

Figure 19:
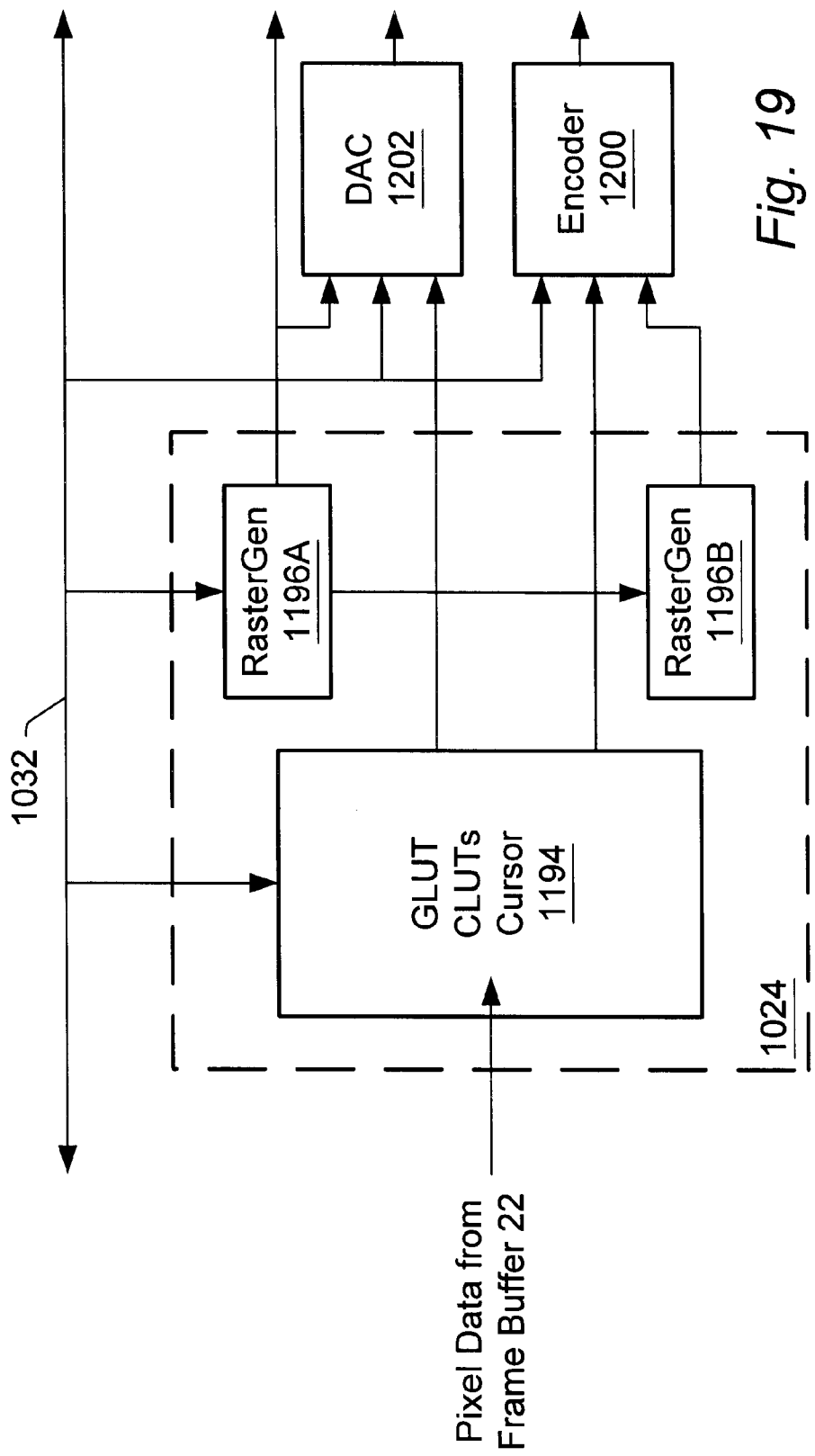
FIG. 19 is a block diagram for one embodiment of video output processor 1024.

Video Output Processor—FIG. 19

Video output processor 1024 may receive a stream of pixels from the pixel area of frame buffer 1022. Video output processor 1024 may operate on the pixel stream by performing operations such as plane group extraction, gamma correction, pseudocolor or color lookup or bypass, and/or cursor generation. For example, video output processor 1024 may include gamma and color map lookup tables (GLUTs, CLUTs) 1194 as suggested by FIG. 19.

Video output processor 1024 may also be configured to support two video output streams to two displays using the two independent video raster timing generators 1196. For example, one raster (e.g., 1196A) may drive a 1280x1024 CRT while the other (e.g., 1196B) may drive a NTSC or PAL device with encoded television video.

DAC 1202 may operate as the final output stage of graphics system 112. The DAC 1202 translates the digital pixel data received from GLUT/CLUTs/Cursor unit 1194 into analog video signals that are then sent to a display device. In one embodiment, DAC 1202 may be bypassed or omitted completely in order to output digital pixel data in lieu of analog video signals. This may be useful when a display device is based on a digital technology (e.g., an LCD-type display or a digital micro-mirror display).

DAC 1202 may be a red-green-blue digital-to-analog converter configured to provide an analog video output to a display device such as a cathode ray tube (CRT) monitor. In one embodiment, RGB DAC 1202 may be configured to provide a high resolution RGB analog video output at dot rates of 240 MHz. Similarly, encoder 1200 may be configured to supply an encoded video signal to a display. For example, encoder 1200 may provide encoded NTSC or PAL video to an S-Video or composite video television monitor or recording device.

In other embodiments, the video output processor 1024 may output pixel data to other combinations of displays. For example, by outputting pixel data to two DACs 1202 (instead of one DAC 1202 and one encoder 1200), video output processor 1024 may drive two CRTs. Alternately, by using two encoders 1200, video output processor 1024 may supply appropriate video input to two television monitors. Generally, many different combinations of display devices may be supported by supplying the proper output device and/or converter for that display device.

Sample Filter Unit 1172

Hardware accelerator 1018 is configured to receive a stream of graphics primitives from media processor 1014 and to render the graphics primitives in terms of samples. The samples are stored into a sample area of frame buffer 1022. Hardware accelerator also includes sample filter 1172 which operates on samples to generate pixel values. Sample filter 1172 reads samples from the sample area of the frame buffer 1022, filters the samples with a programmable filter function, and stores the resulting pixel values into a pixel area of frame buffer 1022. Video output processor 1024 reads pixel values from the pixel area of frame buffer 1022, and generates a video output signal from the pixel values. The video signal is made available to a display device (e.g. a monitor or projector).

In one embodiment, sample filter 1172 may be optimized to perform the processing operations described in FIG. 13. Thus, the description surrounding FIG. 13 may be interpreted as a description of sample filter 1172 with the natural qualifications that (a) sample buffer 162 is to be replaced by the sample area of frame buffer 1022 as the source of samples and (b) the pixel area of frame buffer 1022 is to serve as a temporary storage area for the generated pixels (i.e. before video output processor 1025 reads the pixels and transforms them into output video.

Sample filter 1172 scans through the sample space generating an array of pixel positions and computes a pixel (i.e. a set of pixel values—red, green, blue, α) at each pixel position based on a spatial filtration of the samples in the neighborhood of the pixel position. The horizontal and vertical pixel step sizes and the array start position used by the sample filter 1172 may be programmable by host software.

Furthermore, sample filter 1172 includes a FilterMode register. The value of the FilterMode register determines the type of filtering to be applied by sample filter 1172 on samples. The value FilterMode=Box commands sample filter 1172 to perform box filtering. The value FilterMode= Radial commands sample filter 1172 to perform radially symmetric filtering with a circular filter support and a radially symmetric filter function. Any of a variety of other modes may be implemented as well.

Sample filter 1172 includes a filter weight lookup table. If radial symmetric filtering is selected, host software may download values to the filter weight lookup table. Sample filter 1172 may access the filter weight lookup table using normalized square sample radius as described above. In other words, the entries of the filter weight lookup table may be indexed according to normalized square sample radius. The filter weight values may be signed fixed point operands in the range (−1,1) or [−1,1) or (−1,1] or [−1,1].

To compute the normalized square sample radius, sample filter 1172 may rely upon a register which stores the reciprocal of the filter's square radius, i.e. the quantity $1/(R_f)^2$. Host software may program this register at initialization time.

If the box filter mode is selected, host software may program a filter radius register which stores the box filter radius (i.e. half the side length of the square which defines the box filter support). The filter radius may be used to compute boundary coordinates for the box filter support.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:

a frame buffer;

an accelerator unit configured to receive graphics primitives, render samples for the graphics primitives, and store the samples into a first area of the frame buffer;

wherein the accelerator unit is further configured to (a) read samples from the first area of the frame buffer, (b) filter the samples with a programmable filter to generate pixel values, and (c) store the pixel values in a second area of the frame buffer;

a video output processor configured to (d) read said pixel values from the second area of the frame buffer and (e) generate at least a portion of a video signal from said pixel values.

2. The graphics system of claim 1 further comprising a display device, wherein the video output processor is configured to provide said video signal to the display device.

3. The graphics system of claim 1 wherein the accelerator unit comprises a filter weight lookup table and a sample filter unit, wherein the filter weight lookup table is implemented in RAM and stores filter weights defining the programmable filter, wherein the sample filter unit is configured to read said filter weights from the filter weight lookup table and filter said samples with one or more of said filter weights to generate said pixel values.

4. The graphics system of claim 3, wherein said filter weights of said filter weight lookup table are modifiable by a host software program executing on a host computer.

5. The graphics system of claim 3, wherein the sample filter unit is configured to compute normalized square distances for said samples with respect to a current pixel position, to determine which of said samples reside interior to a filter support region corresponding to said programmable filter by comparing said normalized square distances to an upper limit value.

6. The graphics system of claim 5, wherein the sample filter unit is configured to compute the normalized square distance for a first of said samples by (i) computing a sum of squares of horizontal and vertical displacements of the first sample with respect to the current pixel position and (ii) multiplying said sum of squares by the reciprocal of the square of a radius of the filter support region.

7. The graphics system of claim 6, wherein the reciprocal of the square of the radius of the filter support region is stored in a programmable register.

8. The graphics system of claim 5, wherein the sample filter unit is configured to perform (b) by:

assigning a weight value of zero for each sample that resides exterior to the filter support region;
assigning a weight value for each sample interior to the filter support region by accessing the filter weight lookup table with the corresponding normalized square distance;
multiplying sample attributes for each of said samples by the corresponding weight value to obtain weighted sample attributes;
accumulating one or more sums of weighted sample attributes;
accumulating a sum of said weight values of said samples;
multiplying each of said one or more sums of weighted sample attributes by a reciprocal of said sum of said weight values.

9. The graphics system of claim 5, wherein the sample filter unit is configured to perform (b) by:
assigning a weight value for each of said samples residing interior to the filter support region by accessing the filter weight lookup table with the corresponding normalized square distance;
multiplying sample attributes for each of said interior samples by the corresponding weight value to obtain weighted sample attributes;
accumulating one or more sums of the weighted sample attributes corresponding to the interior samples;
accumulating a sum of said weight values corresponding to said interior samples;
multiplying each of said one or more sums of weighted sample attributes by a reciprocal of said sum of said weight values.

10. The graphics system of claim 1, wherein said samples correspond to a set of bins which cover a filter support region centered at a current pixel position.

11. The graphics system claim 1, wherein said accelerator unit is programmable to set the programmable filter to a box filter having a rectangular filter support region, wherein said accelerator unit is configured to filter said samples by applying a constant weighting to a subset of said samples residing interior to the rectangular filter support region.

12. The graphics system of claim 11, wherein the rectangular filter support region is a square.

13. The graphics system of claim 1, wherein (c) and (d) are performed asynchronously and a different clock rates.

14. A method for generating displayable images, the method comprising:
(a) receiving a stream of graphics primitives;
(b) rendering samples for the graphics primitives;
(c) storing the samples into a first area of a frame buffer;
(d) reading samples from the first area of the frame buffer;
(e) filtering the samples with a programmable filter which covers a programmable support region to generate pixel values;
(f) storing the pixel values in a second area of the frame buffer;
(g) reading the pixel values from the second area of the frame buffer; and
(h) generating a portion of a video signal from the pixel values and providing said video signal to a display device, wherein (b) and (e) are performed by dedicated circuitry configured within a single integrated circuit.

15. The method of claim 14 wherein (e) comprises:
reading filter weights from a set of filter weights stored in a filter weight lookup table, wherein the set of filter weights define the programmable filter;
and filtering said samples with one or more of said filter weights to generate said pixel values.

16. The method of claim 15 further comprising a host computer writing said set of filter weights into said filter weight lookup table.

17. The method of claim 15, wherein (e) further comprises:
computing normalized square distances for said samples with respect to a current pixel position;
determining which of said samples reside interior to the programmable support region by comparing said normalized square distances to an upper limit value.

18. The method of claim 17, wherein said computing the normalized square distance for a first of said samples comprises: (i) computing a sum of squares of horizontal and vertical displacements of the first sample with respect to the current pixel position and (ii) multiplying said sum of squares by the reciprocal of the square of a radius of the programmable support region.

19. The method of claim 17, wherein (e) comprises:
assigning a weight value of zero for each sample that resides exterior to the programmable support region;
assigning a weight value for each sample interior to the filter support region by reading the filter weight lookup table with the corresponding normalized square distance;
multiplying sample attributes for each of said samples by the corresponding weight value to obtain weighted sample attributes;
accumulating one or more sums of said weighted sample attributes corresponding to said samples;
accumulating a sum of said weight values of said samples; and
multiplying said one or more sums of weighted sample attributes by a reciprocal of said sum of said weight values.

20. The method of claim 17, wherein (e) comprises:
assigning a weight value for each of said interior samples by reading the filter weight lookup table with the corresponding normalized square distance;
multiplying sample attributes for each of said interior samples by the corresponding weight value to obtain weighted sample attributes;
accumulating one or more sums of said weighted sample attributes corresponding to said interior samples;
accumulating a sum of said weight values of said samples; and
multiplying said one or more sums of weighted sample attributes by a reciprocal of said sum of weight values.

21. The method claim 14 wherein (e) comprises:
setting the programmable support region to a rectangular region and setting the programmable filter to a constant filter, and applying the constant filter to a subset of said sample residing interior to the rectangular region to generate said pixel values.

22. The method of claim 14 wherein (f) and (g) are performed asynchronously and at different clock rates.

23. A memory medium comprising computer readable instructions, wherein the instructions are executable to implement:

(a) receiving a stream of graphics primitives;

(b) rendering samples for the graphics primitives;

(c) storing the samples into a first area of a frame buffer;

(d) reading samples from the first area of the frame buffer;

(e) filtering the samples with a programmable filter which covers a programmable support region to generate pixel values;

(f) storing the pixel values in a second area of the frame buffer;

(g) reading the pixel values from the second area of the frame buffer; and (h) generating a portion of a video signal from the pixel values and providing said video signal to a display device, wherein (b) and (e) are performed by dedicated circuitry configured within a single integrated circuit.

* * * * *